(12) United States Patent
Tomekawa et al.

(10) Patent No.: US 8,426,004 B2
(45) Date of Patent: Apr. 23, 2013

(54) MULTILAYER INFORMATION RECORDING MEDIUM MANUFACTURING METHOD, MULTILAYER INFORMATION RECORDING MEDIUM MANUFACTURING APPARATUS, AND MULTILAYER INFORMATION RECORDING MEDIUM

(75) Inventors: Yuuko Tomekawa, Osaka (JP); Morio Tomiyama, Nara (JP)

(73) Assignee: Panasonic Corporation, Osaka (JP)

( * ) Notice: Subject to any disclaimer, the term of this patent is extended or adjusted under 35 U.S.C. 154(b) by 246 days.

(21) Appl. No.: 12/992,421

(22) PCT Filed: Mar. 12, 2010

(86) PCT No.: PCT/JP2010/001791
§ 371 (c)(1),
(2), (4) Date: Nov. 12, 2010

(87) PCT Pub. No.: WO2010/103853
PCT Pub. Date: Sep. 16, 2010

(65) Prior Publication Data
US 2011/0069603 A1     Mar. 24, 2011

(30) Foreign Application Priority Data

Mar. 13, 2009   (JP) ................................. 2009-060497
Jan. 5, 2010   (JP) ................................. 2010-000378

(51) Int. Cl.
*G11B 7/24*   (2006.01)
(52) U.S. Cl.
USPC ..................... 428/64.1; 428/64.4; 430/270.11
(58) Field of Classification Search ................. 428/64.4; 430/270.11
See application file for complete search history.

(56) References Cited

U.S. PATENT DOCUMENTS 8,158,233 B2 *   4/2012   Nishihara et al. ............ 428/64.1
2004/0232570 A1   11/2004   Hayashi et al.
2010/0255347 A1   10/2010   Tomekawa et al.

FOREIGN PATENT DOCUMENTS

JP          2005-259331          9/2005
(Continued)

OTHER PUBLICATIONS

International Search Report issued Apr. 27, 2010 in International (PCT) Application No. PCT/JP2010/001791.

*Primary Examiner* — Elizabeth Mulvaney
(74) *Attorney, Agent, or Firm* — Wenderoth, Lind & Ponack, L.L.P.

(57) ABSTRACT

The invention provides a multilayer information recording medium manufacturing method, a multilayer information recording medium manufacturing apparatus, and a multilayer information recording medium that enable to make a distance from a light incident surface of the multilayer information recording medium to a farthest information recording layer thereof uniform within a plane of the medium. A multilayer information recording medium manufacturing apparatus (1) is provided with a sputtering device (3) that forms at least three information recording layers, a screen printing machine (4) that forms a first intermediate layer by screen printing, and forms a second intermediate layer by screen printing in such a manner that thickness variation of the multilayer information recording medium having the first intermediate layer is suppressed, and a spin coating device (5) that forms a cover layer by a spin coating method in such a manner that a thickness of an inner periphery of the multilayer information recording medium having the second intermediate layer becomes smaller than a thickness of an outer periphery of the multilayer information recording medium.

17 Claims, 20 Drawing Sheets

FOREIGN PATENT DOCUMENTS

| | | |
|---|---|---|
| JP | 2006-294161 | 10/2006 |
| JP | 2007-293997 | 11/2007 |
| WO | 02/101736 | 12/2002 |
| WO | 2009/066414 | 5/2009 |

* cited by examiner

FIRST STEP

SECOND STEP

THIRD STEP

MULTILAYER INFORMATION RECORDING MEDIUM MANUFACTURING METHOD, MULTILAYER INFORMATION RECORDING MEDIUM MANUFACTURING APPARATUS, AND MULTILAYER INFORMATION RECORDING MEDIUM

TECHNICAL FIELD

The invention relates to a multilayer information recording medium including at least three information recording layers, plural intermediate layers formed between the information recording layers, and a cover layer including a light incident surface; a multilayer information recording medium manufacturing method for manufacturing the multilayer information recording medium; and a multilayer information recording medium manufacturing apparatus for manufacturing the multilayer information recording medium.

BACKGROUND ART

In recent years, as the information amount required for devices such as information devices and video-audio devices has been increased, there has been increased a demand for information recording media such as an optical disc easily accessible to data, capable of storing a large amount of data, and advantageously used in miniaturizing the device. High density of recording information is realized in such an optical disc. For instance, as means for realizing a high-density optical disc, there have been proposed a single-layer optical recording medium having a recording capacity of about 25 GB, and a two-layer optical recording medium having a recording capacity of about 50 GB. In these optical recording media, information is recorded or reproduced by a reproduction head using laser light having a wavelength of about 400 nm, and a collecting lens for converging the laser light and having a numerical aperture (hereinafter, also called as "NA") of 0.85. Further, there has also been proposed a multilayer information recording medium having three or more information recording layers.

FIG. 19 is a cross-sectional view of a conventional multilayer information recording medium. The multilayer information recording medium shown in FIG. 19 is constituted of a signal substrate 201 having a transferred concave-convex information surface with pits or guide grooves on one surface thereof, a first film layer 202 disposed on the concave-convex information surface of the signal substrate 201, an intermediate layer 203 having a transferred concave-convex information surface with pits or guide grooves on a surface thereof opposite to the surface adhered to the first film layer 202, a second film layer 204 disposed on the concave-convex information surface of the intermediate layer 203, a transparent substrate 206 disposed opposite to the intermediate layer 203, and a transparent layer 205 adapted to adhere the second film layer 204 and the transparent substrate 206 to each other.

Pits or guide grooves are transferred and formed on one surface of the signal substrate 201 by e.g. injection compression molding using a stamper. An information recording layer is formed by forming a film layer on an information surface, as described above. The thickness of the signal substrate 201 is about 1.1 mm. The first film layer 202 and the second film layer 204 include a recording film and a reflection film. The recording film and the reflection film are formed on the surfaces of the signal substrate 201 and the intermediate layer 203 having the pits or the guide grooves by e.g. sputtering or vapor deposition.

The intermediate layer 203 is formed by a spin coating method using a photo-curable resin. Specifically, a transfer substrate having pits or guide grooves on one surface thereof like the signal substrate 201 is adhered, with an information surface thereof opposed to the signal substrate 201, by way of a photo-curable resin. After the photo-curable resin is photo-cured, the transfer substrate is peeled off from a boundary with the photo-cured resin layer, whereby the intermediate layer 203 is formed.

The transparent substrate 206 is made of a transparent material having transparency with respect to recording light or reproducing light, and has a thickness of about 0.1 mm. The transparent layer 205 is provided to adhere the two substrates 206 and 207 to each other, and is made of an adhesive agent such as a photo-curable resin or a pressure sensitive adhesive agent. The transparent substrate 206 and the transparent layer 205 as a whole may also be called as a cover layer. The cover layer may be formed by curing the transparent layer 205, without adhering the transparent substrate 206. Recording or reproducing information with respect to the multilayer information recording medium having the above construction is performed by irradiating the multilayer information recording medium with recording layer light or reproducing laser light from the side of the transparent substrate 206.

In the multilayer information recording medium having the above construction, it is often the case that the intermediate layers and the cover layer are formed by a spin coating method using e.g. a UV curable resin (see e.g. patent literature 1).

However, in the case where transparent intermediate layers for use in separating adjacent information surfaces from each other, and a cover layer are formed by a spin coating method, small film thickness variations in circumferential direction, and large film thickness variations in radial direction may occur. In particular, there is a problem that film thickness variations are likely to increase resulting from accumulation of film thickness variations in laminating plural information recording layers and plural intermediate layers. Further, in the case where a UV curable resin is coated by a spin coating method, the resin spreads to an outer perimeter of a substrate to be coated. As a result, when the spin rotation is stopped, and the resin is cured by light irradiation, the resin may be swollen on the outer perimeter of the substrate to be coated by surface tension, with the result that the film thickness may be increased.

Because of the film thickness variations, when a signal is recorded or reproduced with respect to the multilayer information recording medium by using a laser, spherical aberration may be generated, which may affect variations of convergence of a beam spot, focus control of collecting a beam spot on an information surface, and tracking control of controlling a beam spot to follow a signal train. Further, in the spin coating method, since control on the conditions for realizing coat thickness uniformity is complicated, and spin coating is performed layer by layer, it is difficult to shorten a tact time.

On the other hand, in the case where the number of information recording layers to be laminated is increased to increase the recording capacity, and plural resin layers are laminated, high thickness precision is required. This is because of the following reason. Specifically, it is necessary to know the positions of the respective layers in the multilayer information recording medium by the main body of a reproducing device in advance in order to reproduce signals from the multilayer information recording medium by the reproducing device. The positional displacement between the respective layers results from a thickness distribution of a resin layer. Further, as the number of resin layers to be laminated is increased, high-precision position information is required. In view of the above, it is necessary to increase the thickness precision of the respective resin layers in the multilayer information recording medium.

Further, if there is a thickness variation inherent to a process of forming a resin layer, the thickness variation is accumulated, each time a resin layer is formed. As a result, the thickness variation from a surface of the multilayer information recording medium to a farthest information recording layer thereof is increased, which may make it difficult to perform focus control, and may deteriorate the signal quality.

FIG. 20 is a diagram showing a signal substrate for a conventional optical disc. FIG. 21 is a cross-sectional view of the signal substrate for the optical disc shown taken along the line 21-21 in FIG. 20. FIG. 22 is a diagram for describing a thickness distribution of a resin layer.

In the case where a resin layer is formed on a signal substrate for an optical disc by screen printing, a thickness distribution may vary depending on the shape of the substrate. For instance, as shown in FIG. 20, a signal substrate 300 for an optical disc is formed with a convex rib 301 on a central part thereof. The rib 301 is provided to prevent the user's difficulty in picking up an optical disc which may be contacted with the optical disc surface with a table or a floor, in the case where the optical disc is placed on a flat surface such as a table or a floor. Forming a protrusion on an inner periphery of an optical disc makes it easy for the user to pick up the optical disc, because there is formed a clearance between the table surface and the optical disc surface.

The rib 301 exhibits the above advantage by protrusion from the optical disc surface. In view of this, the rib 301 protrudes with a larger amount than the thickness of a resin layer to be formed in a substrate. The rib 301, however, may seriously affect in forming a resin layer by screen printing.

The rib 301 shown in FIG. 21 has a height of 0.2 mm from an information surface 302 at a position radially away from the center of the signal substrate 300 for an optical disc by 18 mm to 20 mm. A resin layer of 0.1 mm in thickness is formed on the information surface 302 of the substrate 300. Accordingly, the manufactured optical disc has a protrusion of 0.1 mm in height.

As shown in FIG. 22, in the case where the signal substrate 300 for an optical disc having the rib 301 at the inner periphery thereof is subjected to screen printing, the thickness of a resin layer is increased by a region where a squeegee 401 is contacted with the rib 301. This phenomenon is likely to occur particularly on an inner periphery of the disc near the rib 301.

Accordingly, as shown in FIG. 22, the thickness of a resin layer is increased on an elliptical area 403 in the inner periphery of the signal substrate 300 for an optical disc, as compared with the other area. In FIG. 22, the squeegee 401 slides in the direction shown by the arrow 402.

The thickness distribution of a resin layer varies because the squeegee 401 is made of a soft material such as rubber. FIG. 23 is a diagram showing a squeegee and a signal substrate for an optical disc when the squeegee passes a central part of the signal substrate for an optical disc. FIG. 24 is a cross-sectional view of the squeegee and the signal substrate for an optical disc taken along the line 24-24 in FIG. 23. In FIG. 23, the squeegee 401 slides in the direction shown by the arrow 402.

As shown in FIG. 24, when the squeegee 401 is contacted with the rib 301, the squeegee 401 is pushed upward by the rib 301. As a result, there is formed a clearance 404 between the squeegee 401 and the signal substrate 300 for an optical disc, at a periphery of the rib 301. Since the clearance between the squeegee 401 and the signal substrate 300 for an optical disc at the periphery of the rib 301 is increased, as compared with the other part, the thickness of a resin layer to be formed is increased at the periphery of the rib 301. This phenomenon is serious on the area 403 near the rib 301, whereas the thickness of the resin layer becomes substantially uniform on an area away from the rib 301. Further, the area 403 having a larger resin layer thickness is formed only in a region where the squeegee 401 is contacted with the rib 301.

As described above, a resin layer formed by screen printing has thickness variation along the moving direction of the squeegee that the thickness is small on a disc end, and the thickness is large on a disc inner periphery. As a result, particularly, in the case where plural resin layers of a multilayer information recording medium having plural information recording layers are formed by screen printing, the problem that the thickness variation is increased becomes serious. Specifically, in the case where the areas each having a largest resin layer thickness are overlapped on the disc inner periphery, the thickness variations are accumulated as a whole. If a cover layer is formed on the resin layers in this condition, thickness variation from the disc surface to the farthest information recording layer is increased, which may seriously affect the signal quality in recording or reproducing information with respect to the multilayer information recording medium.

CITATION LIST

Patent Literature

Patent Literature 1: JP 2005-259331A

SUMMARY OF INVENTION

In view of the above, an object of the invention is to provide a multilayer information recording medium manufacturing method, a multilayer information recording medium manufacturing apparatus, and a multilayer information recording medium that enable to make the distance from a light incident surface of the multilayer information recording medium to a farthest information recording layer thereof uniform within a plane of the medium.

A multilayer information recording medium manufacturing method according to an aspect of the invention is a multilayer information recording medium manufacturing method for manufacturing a multilayer information recording medium having at least three information recording layers. The method includes a first information recording layer forming step of forming a first information recording layer on a substrate; a first intermediate layer forming step of forming a first intermediate layer on the first information recording layer by screen printing; a second information recording layer forming step of forming a second information recording layer on the first intermediate layer; a second intermediate layer forming step of forming a second intermediate layer on the second information recording layer by screen printing in such a manner that thickness variation of the multilayer information recording medium after the first intermediate layer has been formed is suppressed; a third information recording layer forming step of forming a third information recording layer on the second intermediate layer; and a cover layer forming step of forming a cover layer by a spin coating method in such a manner that a thickness of an inner periphery of the multilayer information recording medium after the third information recording layer has been formed becomes smaller than a thickness of an outer periphery of the multilayer information recording medium.

With the arrangement described above, the first information recording layer is formed on the substrate, and the first intermediate layer is formed on the first information recording layer by screen printing. Then, the second information recording layer is formed on the first intermediate layer, and the second intermediate layer is formed on the second information recording layer by screen printing in such a manner that thickness variation of the multilayer information recording medium after the first intermediate layer has been formed is suppressed. Then, after the third information recording layer has been formed on the second intermediate layer, the cover layer is formed by a spin coating method in such a manner that the thickness of the inner periphery of the multilayer information recording medium becomes smaller than the thickness of the outer periphery of the multilayer information recording medium.

According to the invention, thickness variation in circumferential direction is reduced in forming the respective intermediate layers by screen printing, and thickness variation in radial direction is reduced in forming the cover layer by a spin coating method to thereby make the distance from a light incident surface of the multilayer information recording medium to a farthest information recording layer thereof uniform within a plane of the medium.

These and other objects, features and advantages of the present invention will become more apparent upon reading the following detailed description along with the accompanying drawings.

DESCRIPTION OF EMBODIMENTS

In the following, an embodiment of the invention is described referring to the accompanying drawings. The following embodiment is merely an example embodying the invention, and do not limit the technical scope of the invention.

In this embodiment, there is described a construction example of a disc-shaped multilayer information recording medium. The multilayer information recording medium to be manufactured is not limited to a disc-shaped medium. The invention is also directed to a multilayer information recording medium manufacturing method and a multilayer information recording medium manufacturing apparatus capable of forming intermediate layers (hereinafter, also called as "resin layers") at a high speed, and making the resin layer thickness uniform.

Since the processing of manufacturing a multilayer information recording medium, and the processing of recording information in the multilayer information recording medium are constituted of plural processes, these processes are described one by one using the drawings.

Figure 1:
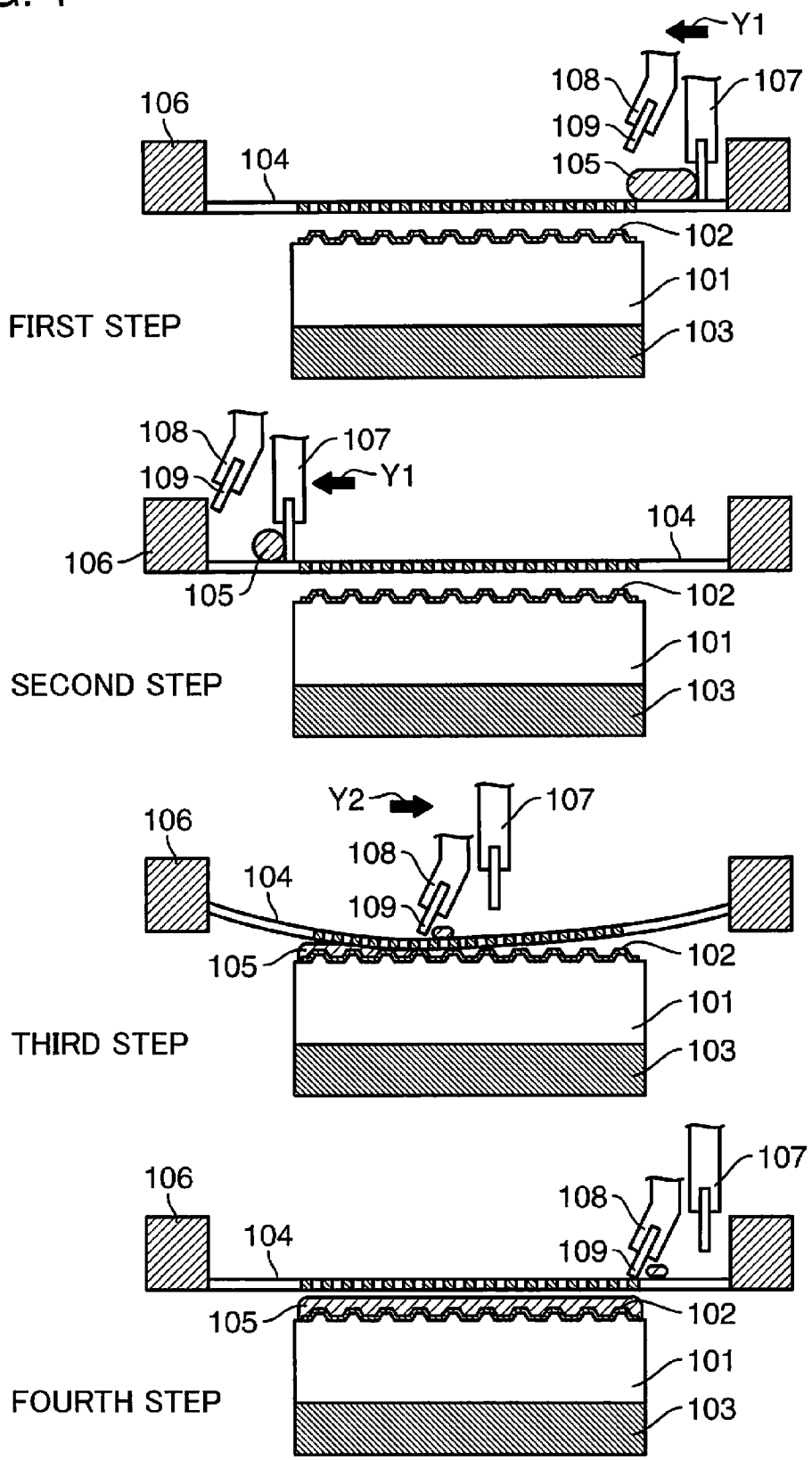
FIG. 1 is a diagram for describing a resin layer forming process in an embodiment of the invention.

Firstly, a process of coating a resin is described referring to FIG. 1. FIG. 1 is a diagram for describing a resin layer forming process in this embodiment.

Examples of the resin layer forming method include a method of attaching an adhesive sheet, a spin coating method of spreading a resin by a centrifugal force, a method of extruding a resin through a nozzle, and an inkjet method. In this embodiment, a resin layer is formed by a screen printing method having a feature that the resin forming speed is fast. The screen printing method is an example of the resin layer forming method, and the invention is not limited to the above.

Firstly, a signal substrate 101 having a first film layer 102 on a surface thereof is fixed on a turntable 103 by means such as vacuum suction means (see the first step in FIG. 1.)

Then, a screen frame 106 is fixedly supported above the signal substrate 101, and a UV curable resin 105 is supplied to a portion of a screen 104 devoid of holes. Then, the UV curable resin 105 is filled in the holes formed in the screen 104 by sliding a scraper 107 in the direction shown by the arrow Y1 (see the second step in FIG. 1).

Then, the UV curable resin 105 is extruded onto the signal substrate 101 through the openings of the hole-plate (screen) 104 by sliding a squeegee 109 fixed to a squeegee fixing jig 108 in the direction shown by the arrow Y2, while applying a pressure to an upper portion of the screen 104 (see the third step in FIG. 1)

Thus, by screen printing, the signal substrate 101 coated with the UV curable resin 105 is obtained (see the fourth step in FIG. 1). Further, by repeating the first step through the fourth step in FIG. 1 while replacing the signal substrate 101 with a new one, a plurality of signal substrates 101 each having a resin layer formed on a surface thereof are manufactured. The sum of a time required for setting the signal substrate 101, a time required for the scraper 107 to slide over the screen 104, and a time required for the squeegee fixing jig 108 to slide over the screen 104 corresponds to a tact time required for a resin layer forming process by screen printing. Thus, it is relatively easy to shorten the tact time.

A material having a large elasticity such as rubber is selected as a material for the squeegee 109. Enhancing the elasticity of the squeegee 109 enables to coat the UV curable resin 105 on the first film layer 102 irrespective of whether there is a thickness variation, even if the signal substrate 101 has thickness variation. Further, enhancing the elasticity of the squeegee 109 allows the screen 104 to absorb a physical load to be applied to the first film layer 102 at the time of printing.

Figure 2:
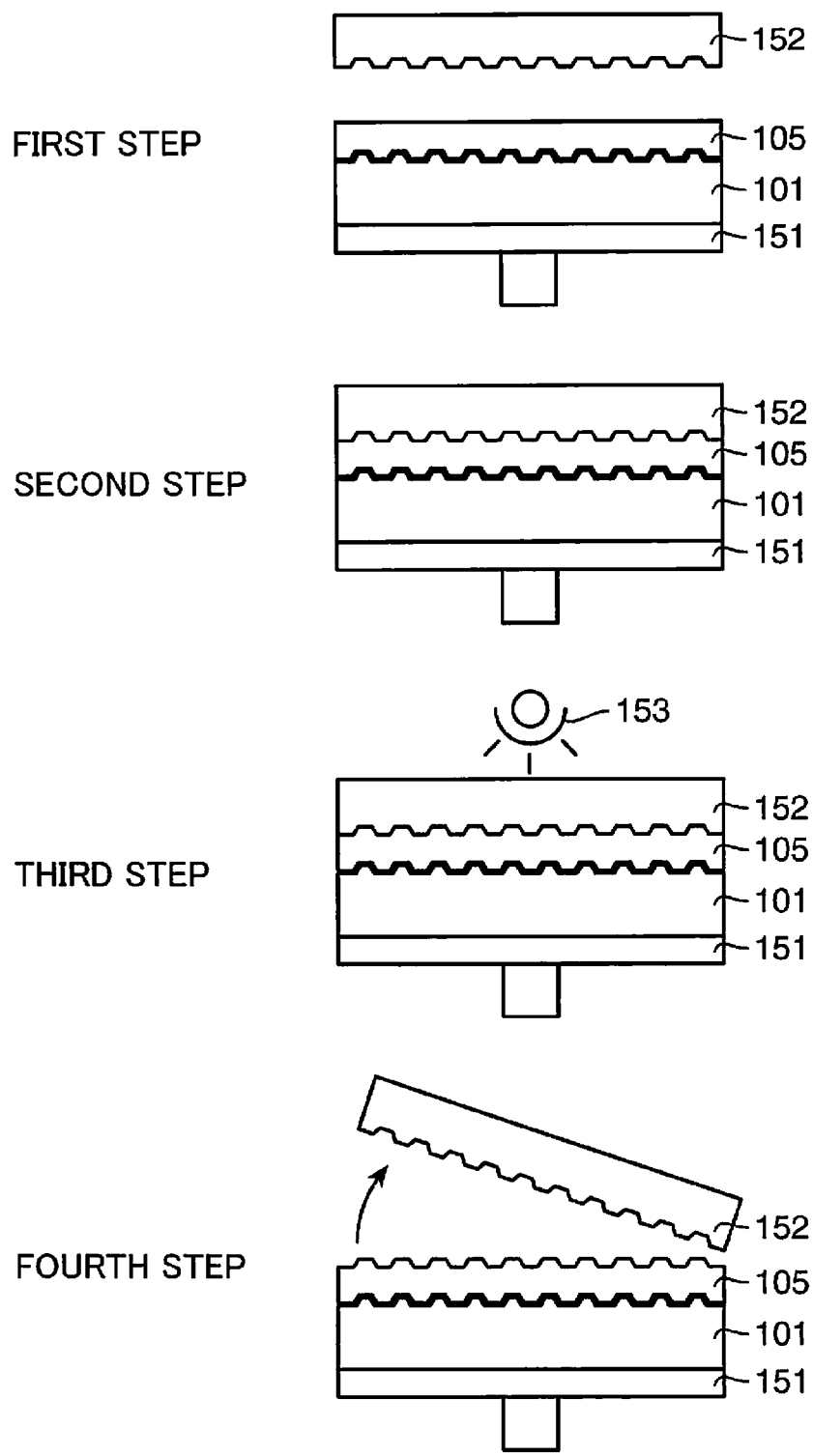
FIG. 2 is a diagram for describing a signal transferring process in the embodiment.

Next, a process to follow the screen printing is described referring to FIG. 2. FIG. 2 is a diagram for describing a signal transferring process in this embodiment.

Firstly, the signal substrate 101 coated with the UV curable resin 105 is placed on a table 151 (see the first step in FIG. 2).

Then, a transfer substrate 152 is pressed against the signal substrate 101 from above, and the UV curable resin 105 is filled in guide grooves (see the second step in FIG. 2). The transfer substrate 152 has a concave-convex portion corresponding to information to be recorded. After the second step, the transfer substrate 152 is irradiated with UV light from above, and the UV curable resin 105 is cured into a UV cured resin layer (see the third step in FIG. 2). Thereafter, the transfer substrate 152 is peeled off from the layer of the UV cured resin 105 (see the fourth step in FIG. 2).

By performing the first step through the fourth step in FIG. 2, the layer of the UV cured resin 105 having a concave-convex portion, which is an inverse pattern of the concave-convex portion of the transfer substrate 152, is formed on the signal substrate 101. Further, a desirable peelability can be maintained by selecting a material having a high peelability with respect to the transfer substrate 152 in advance, as a property of the UV curable resin 105.

After the signal transferring process shown in FIG. 2 is performed, a signal recording layer (information recording layer) is formed by a film forming device such as a sputtering device.

By repeating the resin coating process shown in FIG. 1, the signal transferring process shown in FIG. 2, and the film forming process, information recording layers of a multilayer information recording medium are formed. Further, by forming a transparent layer (cover layer) after the information recording layers have been formed, manufacturing of the multilayer information recording medium is completed.

Figure 3:
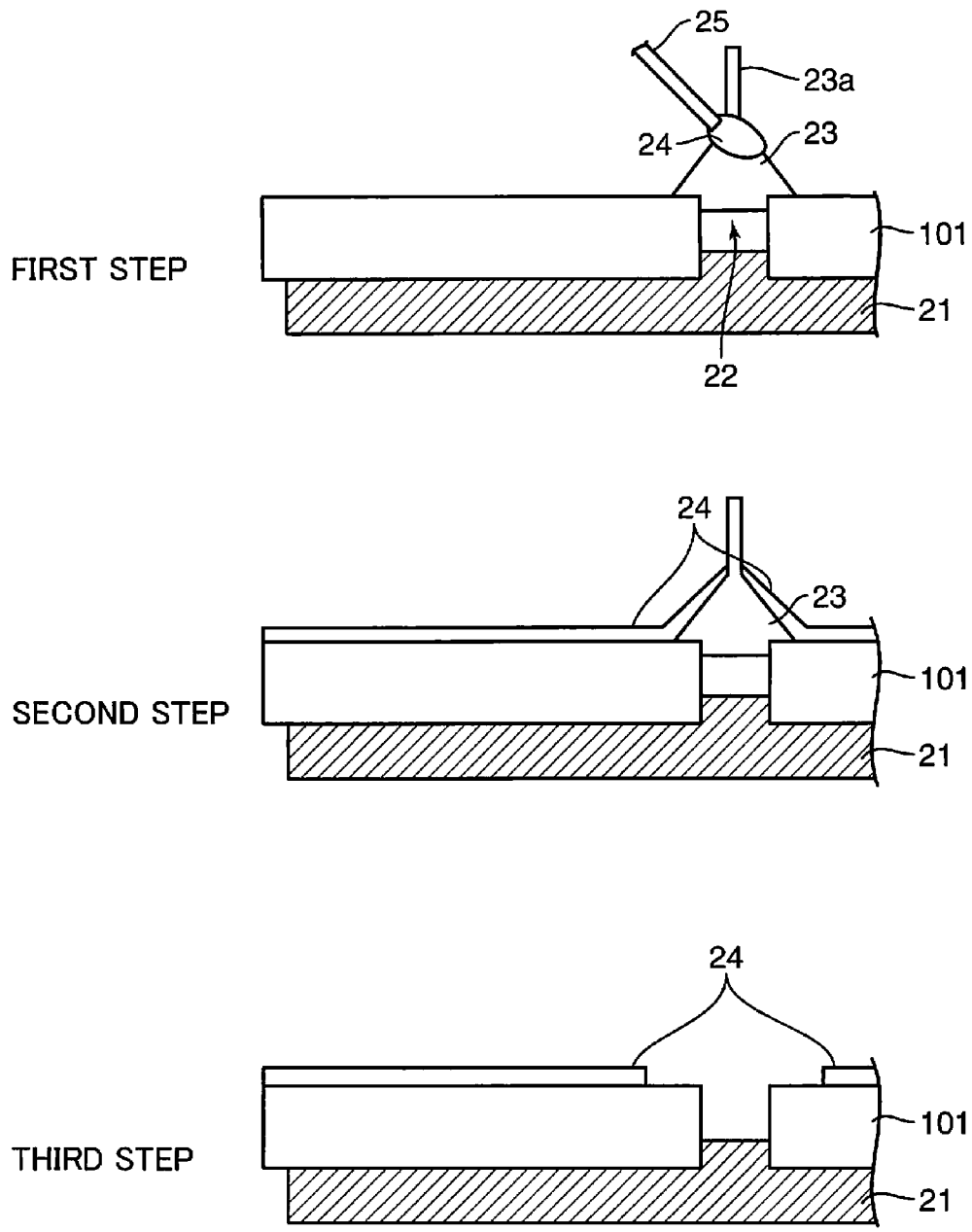
FIG. 3 is a diagram for describing a spin coating process in the embodiment.

In this section, a process of forming a transparent layer by a spin coating method is described referring to FIG. 3. FIG. 3 is a diagram for describing a spin coating process in this embodiment.

There is no need of forming a signal guide groove on a surface of a resin layer (transparent layer) on a light incident surface side of a multilayer information recording medium. However, since the transparent layer is exposed to the surface of the medium, the user may touch the transparent layer with his or her hand, or the transparent layer may be contacted with foreign matters. In view of this, the transparent layer is required to have oil repellency that fat/oil contained in e.g. a fingerprint is less likely to adhere, and to have wear resistance against scratches resulting from rubbing. Further, the surface of the transparent layer is required to be smooth to stably reproduce signals. In order to satisfy these requirements, the transparent layer on the light incident surface side is formed by a spin coating method.

Firstly, the signal substrate 101 is placed on a turntable 21 (see the first step in FIG. 3). A resin layer and a film layer are formed on the signal substrate 101. A center hole 22 is blocked by a conical cap 23, and a UV curable resin 24 is dropped onto the cap 23 through a nozzle 25 by the amount of e.g. 1.5 g.

Then, the signal substrate 101 is accelerated to a rotation speed of about 3,500 turns in about two seconds, and the rotation number is kept for about seven seconds. Thus, the UV curable resin 24 is spread (see the second step in FIG. 3).

A rod 23a is formed on the cap 23 to facilitate attachment/detachment of the cap 23. The cap 23 is easily detached by dropping the UV curable resin 24 in such a manner that the UV curable resin 24 is not adhered to the rod 23a. The nozzle 25 for ejecting the UV curable resin 24 is disposed with an inclination of 90 degrees or less with respect to the disc surface. It is thus possible to eject the UV curable resin 24 near the cap 23, thereby preventing air bubbles from intruding into the UV curable resin 24.

Then, after the cap 23 is detached, UV light is irradiated by a UV irradiator (not shown) (see the third step in FIG. 3). Thus, the UV curable resin 24 is cured, and formation of the transparent layer is completed.

The spin coating method is advantageous in forming a resin layer having a uniform thickness in radial direction and circumferential direction. Further, it is possible to change only the thickness distribution in radial direction, while keeping the thickness distribution in circumferential direction uniform by changing a spin coating condition.

Figure 21:
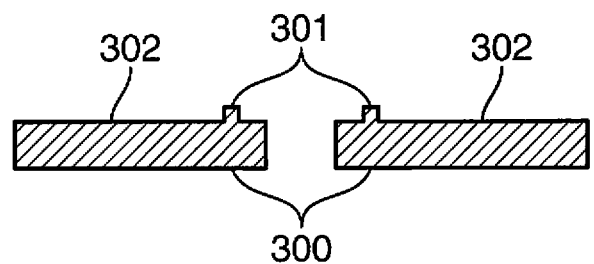
FIG. 21 is a cross-sectional view of the optical disc signal substrate taken along the line 21-21 in FIG. 20.
Figure 22:
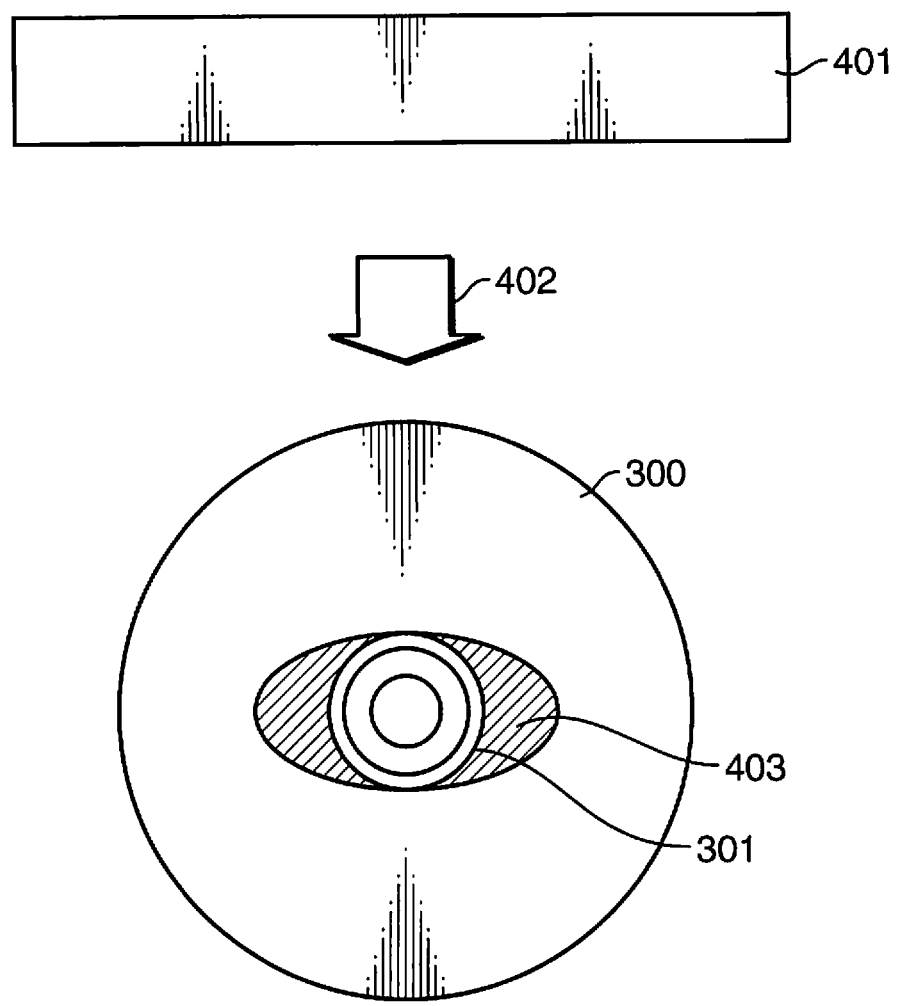
FIG. 22 is a diagram for describing a thickness distribution of a resin layer.
Figure 23:
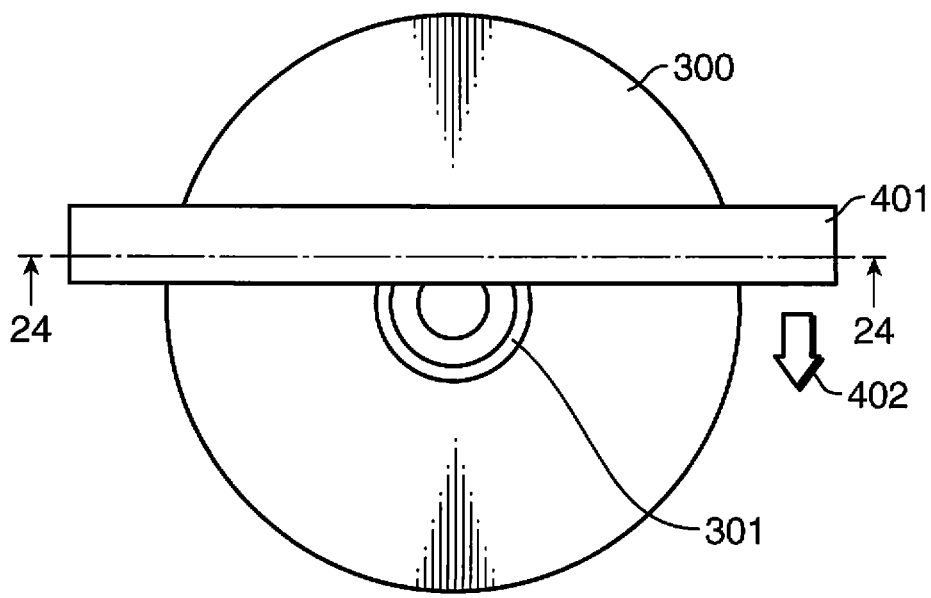
FIG. 23 is a diagram of a squeegee and an optical disc signal substrate, when the squeegee passes a central part of the optical disc signal substrate.
Figure 24:
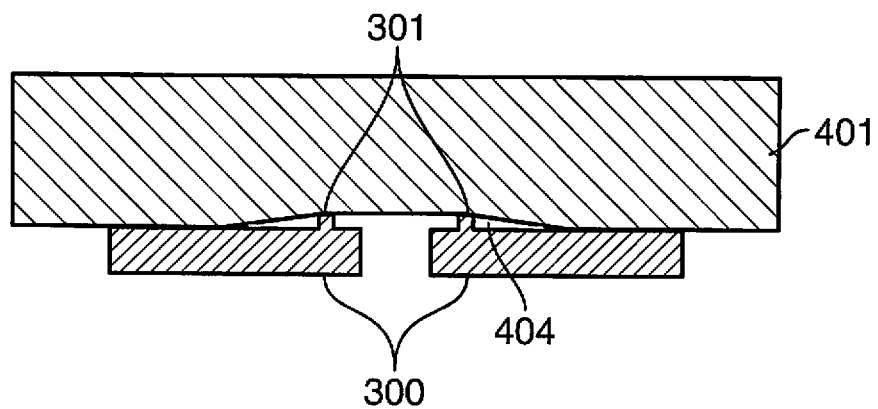
FIG. 24 is a cross-sectional view of the squeegee and the optical disc signal substrate taken along the line 24-24 in FIG. 23.

In the case where an intermediate layer (resin layer) is formed by screen printing, an inner peripheral thickness tends to increase due to e.g. existence of a rib (see FIG. 21). In view of this, it is preferable to form a transparent layer with a small inner peripheral thickness and a large outer peripheral thickness in forming the transparent layer (cover layer) by a spin coating method. An example of the spin coating condition for forming a thickness distribution with a small inner peripheral thickness and a large outer peripheral thickness is disposing an eject port of the nozzle 25 shown in FIG. 3 away from the rod 23a, and dropping the UV curable resin 24 at a position away from the rod 23a. This enables to form an intermediate layer having a thickness distribution that the outer peripheral thickness is large.

Further, it is also possible to adjust the thickness distribution in radial direction by changing the sequence in rotating the turntable 21. In the foregoing, the turntable 21 is accelerated to a rotation speed of 3,500 turns within two seconds. Alternatively, it is possible to set the outer peripheral thickness larger than the inner peripheral thickness by reducing the acceleration time from two seconds to one second.

It is preferable to select a condition for offsetting thickness distributions of intermediate layers that have already been formed by optimally combining the aforementioned conditions concerning the thickness distribution in radial direction.

Figure 4:
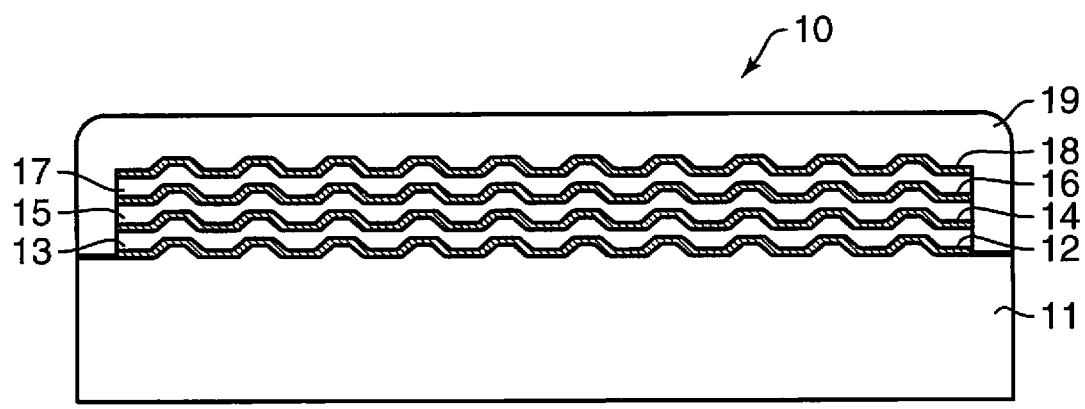
FIG. 4 is a cross-sectional view of a multilayer information recording medium having four information recording layers in the embodiment.

For instance, in the case where a multilayer information recording medium having four information recording layers is manufactured, the resin coating process, the signal transferring process, and the film forming process are repeated three times, and then, a transparent layer is formed by the spin coating process. FIG. 4 is a cross-sectional view of a multilayer information recording medium having four information recording layers in this embodiment.

A multilayer information recording medium 10 having four information recording layers includes a signal substrate 11 having a concave-convex information surface with pits or guide grooves formed on a surface thereof, a first film layer 12 formed on the information surface of the signal substrate 11, a first intermediate layer 13 having a concave-convex information surface with pits or guide grooves formed on a surface thereof opposite to the signal substrate 11, a second film layer 14 formed on the information surface of the first intermediate layer 13, a second intermediate layer 15 having a concave-convex information surface with pits or guide grooves formed on a surface thereof opposite to the first intermediate layer 13, a third film layer 16 formed on the information surface of the second intermediate layer 15, a third intermediate layer 17 having a concave-convex information surface with pits or guide grooves formed on a surface thereof opposite to the second intermediate layer 15, a fourth film layer 18 formed on the information surface of the third intermediate layer 17, and a transparent layer 19 disposed on the fourth film layer 18. In this embodiment, the film layers correspond to an example of information recording layers, and the transparent layer corresponds to an example of a cover layer.

The signal substrate 11 is constituted of a polycarbonate or acrylic resin disc with a diameter of 120 mm and a thickness of about 1.0 to 1.1 mm to prevent flexure of the multilayer information recording medium, secure rigidity, and have thickness compatibility between optical discs of different kinds such as CD, DVD, and Blu-ray Disc. The signal substrate 11 has a concave-convex information surface with pits or guide grooves formed on a surface thereof by resin molding such as injection compression molding, using a conventional stamper. A hole (not shown) of 15 mm in diameter is formed in the central part of the signal substrate 11 to rotate the optical disc while supporting the optical disc in recording or reproducing signals by an optical disc device. In this embodiment, described is an exemplified arrangement, wherein polycarbonate is used as a material for the signal substrate 11.

Figure 20:
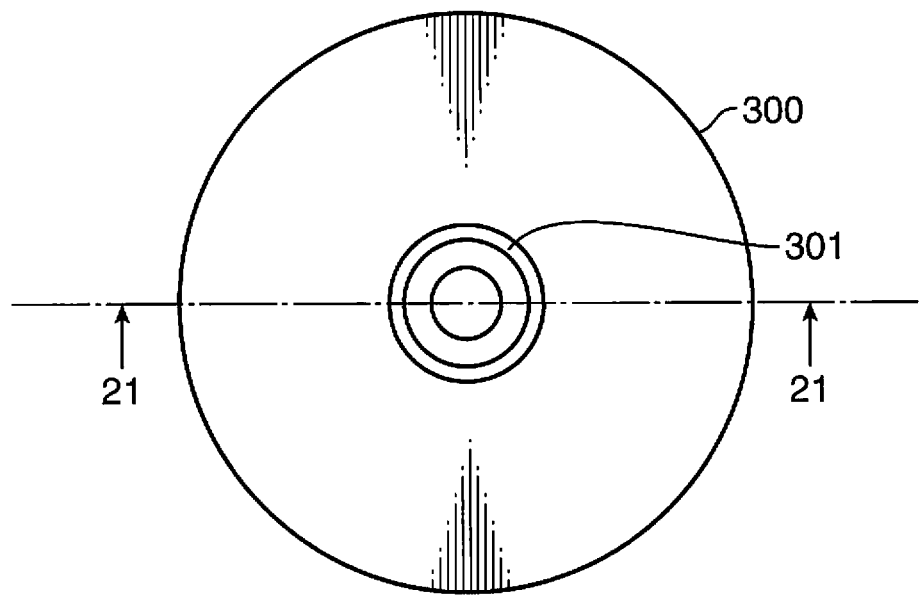
FIG. 20 is a diagram showing a signal substrate for a conventional optical disc.

Further, the signal substrate 11 has a rib at a predetermined position on the inner periphery thereof (see FIGS. 20 and 21).

The intermediate layers 13, 15, and 17 made of a photo-curable resin, and the transparent layer 19 are laminated on the signal substrate 11. Accordingly, for instance, in the case where an information surface is disposed at a position facing above, the laminated multilayer information recording medium has a concave shape resulting from shrinkage by light curing, which is a property of a photo-curable resin. In view of the above, the signal substrate 11 is formed to have a convex shape in advance when the information surface is disposed at a position facing above. Thus, the multilayer information recording medium laminated with the intermediate layers 13, 15, and 17, and the transparent layer 19 has a flat shape.

The first film layer 12 has a reflectance characteristic with respect to reproducing laser light, in the case where the multilayer information recording medium is an ROM optical disc. For instance, the first film layer 12 is formed by depositing a metal such as Al, Ag, Au, Si, or $SiO_2$, a semiconductor material, or a dielectric material by e.g. sputtering or vapor deposition.

Figure 5:
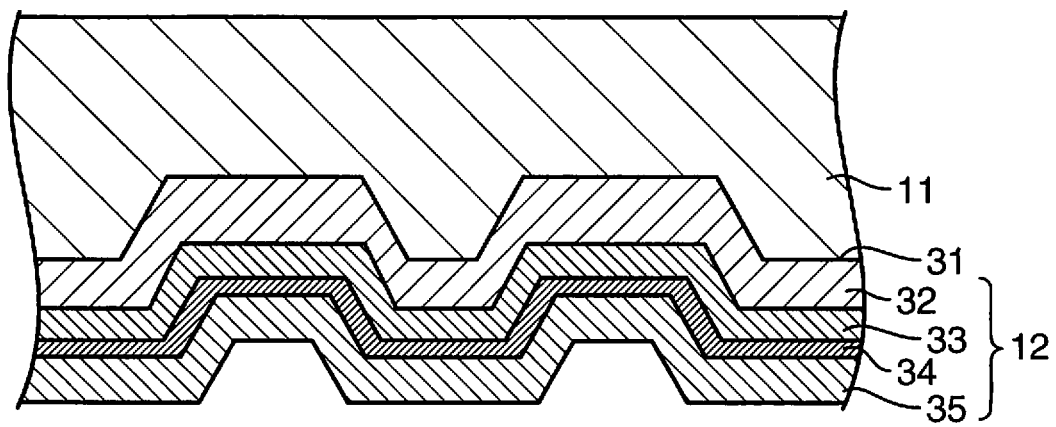
FIG. 5 is a diagram showing an arrangement of a recording film of the multilayer information recording medium in the embodiment.

An arrangement of a recording film in the case where a multilayer information recording medium is a write-once optical disc is described referring to FIG. 5. FIG. 5 is a diagram showing an arrangement of a recording film of a multilayer information recording medium in this embodiment. For instance, a reflection film 32 made of AlCr, a ZnS film 33, a TeOPd recording film 34, and a ZnS film 35 are successively formed on an information surface 31 with pits or guide grooves on the signal substrate 11 by e.g. sputtering or vapor deposition. In other words, the first film layer 12 is constituted of the reflection film 32, the ZnS film 33, the TeOPd recording film 34, and the ZnS film 35.

In this embodiment, described is an arrangement, wherein Al is used as a material for the reflection film 32. Similarly to an ROM optical disc, a material containing a metal such as Ag or Au as a primary component may be used. Further alternatively, a film layer may include e.g. a pigmented coat. The second film layer 14, the third film layer 16, and the fourth film layer 18 are formed substantially in the same manner as the first film layer 12. The thickness of the reflection film 32 may be adjusted depending on the optical characteristic required in recording/reproducing, or the reflection film 32 itself may be omitted. Further alternatively, the thickness of the ZnS film 33 or the TeOPd recording film 34 may be adjusted depending on the optical characteristic.

The first intermediate layer 13 is made of an approximately transparent material having transparency with respect to recording/reproducing light, and is made of a UV curable resin containing acryl as a primary component. The UV curable resin has a property that the resin is not curable with respect to light of a wavelength other than the UV light wavelength, but is curable in any condition by UV irradiation, by setting the wavelength of curing light in a UV wavelength band. The UV curable resin having the above property is advantageous in controlling the shape of a resin layer. The UV curable resin is coated in an area smaller than the outer diameter of the signal substrate 11, but larger than the diameter of the central hole of the signal substrate 11 (see FIG. 4). The second intermediate layer 15 and the third intermediate layer 17 are formed substantially in the same manner and with substantially the same shape as the first intermediate layer 13.

The transparent layer 19 is made of an approximately transparent material having transparency with respect to recording light and reproducing light, and is made of a UV curable resin containing acryl as a primary component. A UV curable resin in a liquid form is used for the transparent layer 19. The transparent layer 19 is formed by coating the UV curable resin on the fourth film layer 18. The UV cured resin layer is formed in such a manner as to cover the signal substrates and the film layers, and is formed to adhere to the signal substrate 11 at an inner periphery and an outer periphery of the signal substrate 11 (see FIG. 4).

The foregoing is a schematic explanation on the manufacturing process of the multilayer information recording medium.

Figure 6:
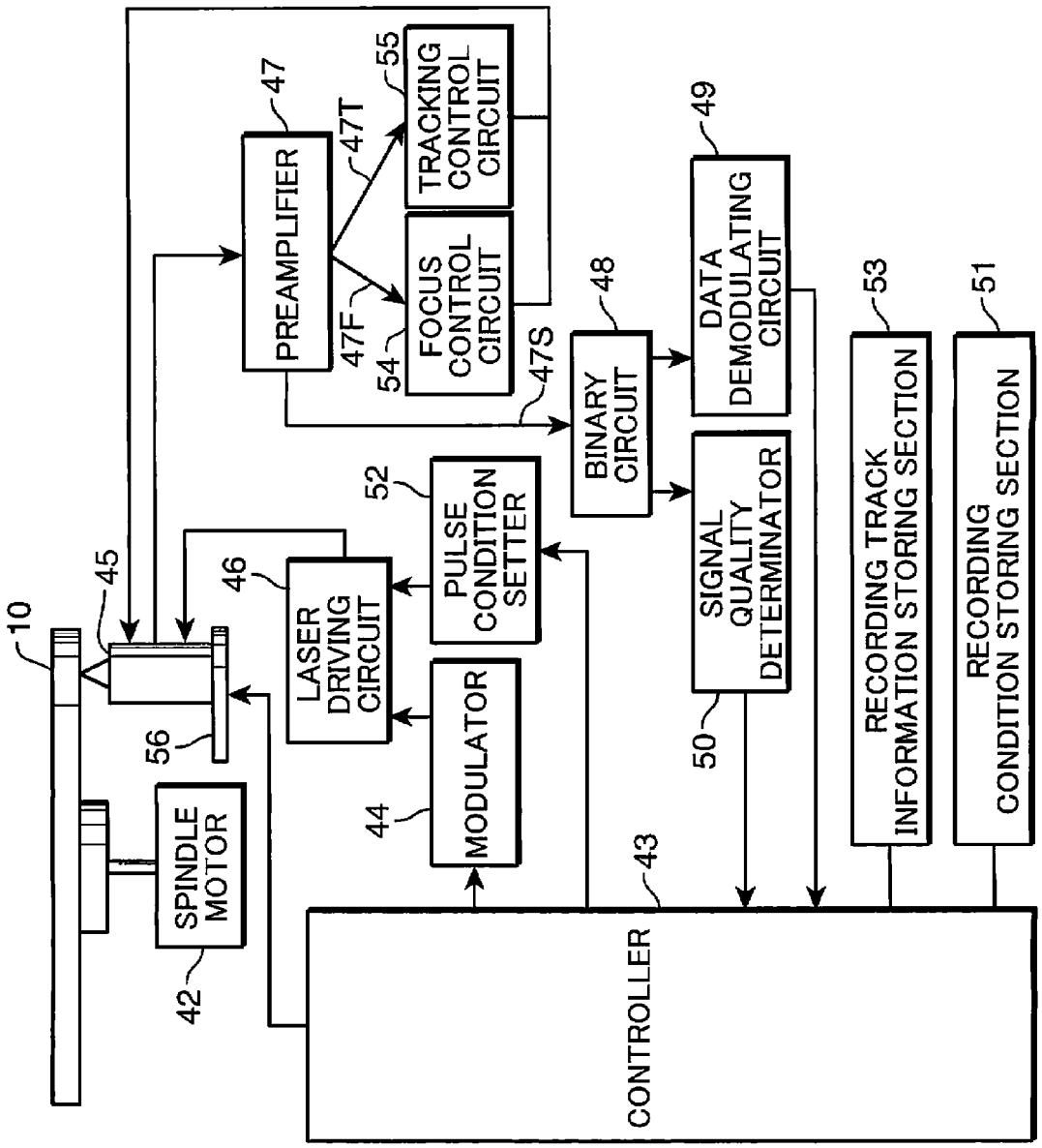
FIG. 6 is a diagram showing a schematic arrangement of an optical disc device in the embodiment.

In this section, an example of an optical disc device for recording and/or reproducing information with respect to the multilayer information recording medium is described. FIG. 6 is a diagram showing a schematic arrangement of the optical disc device in this embodiment.

FIG. 6 shows a state that the multilayer information recording medium 10 is loaded. The optical disc device shown in FIG. 6 is provided with a spindle motor 42, a controller 43, a modulator 44, an optical head 45, a laser driving circuit 46, a preamplifier 47, a binary circuit 48, a data demodulating circuit 49, a signal quality determinator 50, a recording condition storing section 51, a pulse condition setter 52, a recording track information storing section 53, a focus control circuit 54, a tracking control circuit 55, and a mover 56.

The spindle motor 42 rotates the loaded multilayer information recording medium 10. The controller 43 controls the overall operations of the optical disc device. The modulator 44 converts data to be recorded into a recording signal. The optical head 45 has a semiconductor laser, an objective lens, and a detector. The optical head 45 records information by collecting laser light on the multilayer information recording medium 10, and obtains a reproduction signal based on reflected light from the multilayer information recording medium 10. The laser driving circuit 46 drives the semiconductor laser in the optical head 45 in accordance with a recording signal.

The preamplifier 47 amplifies a reproduction signal acquired by the optical head 45, and generates an information reproduction signal 47S, a focus error signal 47F, and a tracking error signal 47T. The binary circuit 48 converts the information reproduction signal 47S into a binary signal. The data demodulating circuit 49 demodulates a binary signal. The signal quality determinator 50 determines the quality of a test signal indicating test-recording of specific data in a test recording area of the multilayer information recording medium 10. The recording condition storing section 51 stores an optimum recording condition acquired by a learning operation.

The pulse condition setter 52 controls laser pulses in accordance with a recording condition stored in the recording condition storing section 51. The recording track information storing section 53 stores recording track information read out from the multilayer information recording medium 10. The focus control circuit 54 controls the optical head 45 to focus laser light on an intended information recording layer of the multilayer information recording medium, based on the focus error signal 47F. The tracking control circuit 55 controls the optical head 45 to allow the laser light to properly scan an intended track of the multilayer information recording medium 10, based on the tracking error signal 47T. The mover 56 moves the optical head 45 in radial direction of the multilayer information recording medium 10.

The focus error signal 47F is generated by a general astigmatism method. The tracking error signal 47T is generated by a general push-pull method.

Firstly, in an activation process, the spindle motor 42 rotates the loaded multilayer information recording medium 10, and thereafter, the optical head 45 irradiates the multilayer information recording medium 10 with laser light for information reproduction, and focuses the laser light on a target information recording layer.

In reproducing e.g. the recording track information, the optical head 45 acquires a reproduction signal based on reflected light from the multilayer information recording medium 10, and the preamplifier 47 generates the information reproduction signal 47S based on the reproduction signal acquired by the optical head 45. The binary circuit 48 has been set to a predetermined binarization slice level. The binary circuit 48 binarizes the information reproduction signal 47S generated by the preamplifier 47. Thereafter, the data demodulating circuit 49 demodulates the signal binarized by the binary circuit 48, and outputs the demodulated signal to the controller 43. Thus, the recording track information recorded in the multilayer information recording medium 10 is reproduced.

Further, in recording information, the modulator 44 converts specified data outputted from the controller 43 into a laser driving signal, and the laser driving circuit 46 drives the semiconductor laser in the optical head 45 in accordance with the laser driving signal. The optical head 45 collects the laser light emitted from the semiconductor laser on the multilayer information recording medium 10, and records information in a recording area of the multilayer information recording medium 10 by tracking the laser light on a groove portion or a land portion of a track, based on the recording track information.

The controller 43 determines whether it is possible to properly record and reproduce a signal with respect to the multilayer information recording medium 10 by comparing a signal obtained by binarizing a reproduction signal of data recorded in the test recording area by the binary circuit 48, with data outputted from the controller 43 in recording in the test recording area.

A reproduction-only multilayer information recording medium has concave-convex pits formed thereon. In using the reproduction-only multilayer information recording medium, the tracking error signal 47T is generated by a general differential push-pull method to thereby cause the laser light to track a pit train, and perform only information reproduction.

Figure 7A:
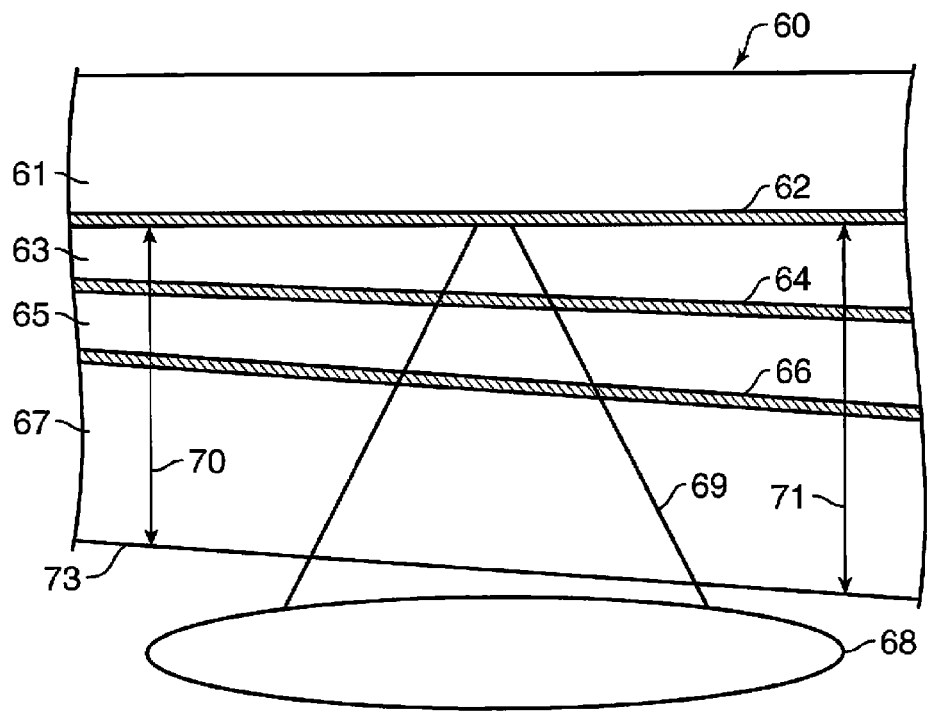
FIG. 7A is a diagram showing an arrangement of a multilayer information recording medium where thickness correction has not been performed in a resin layer forming process.
Figure 7B:
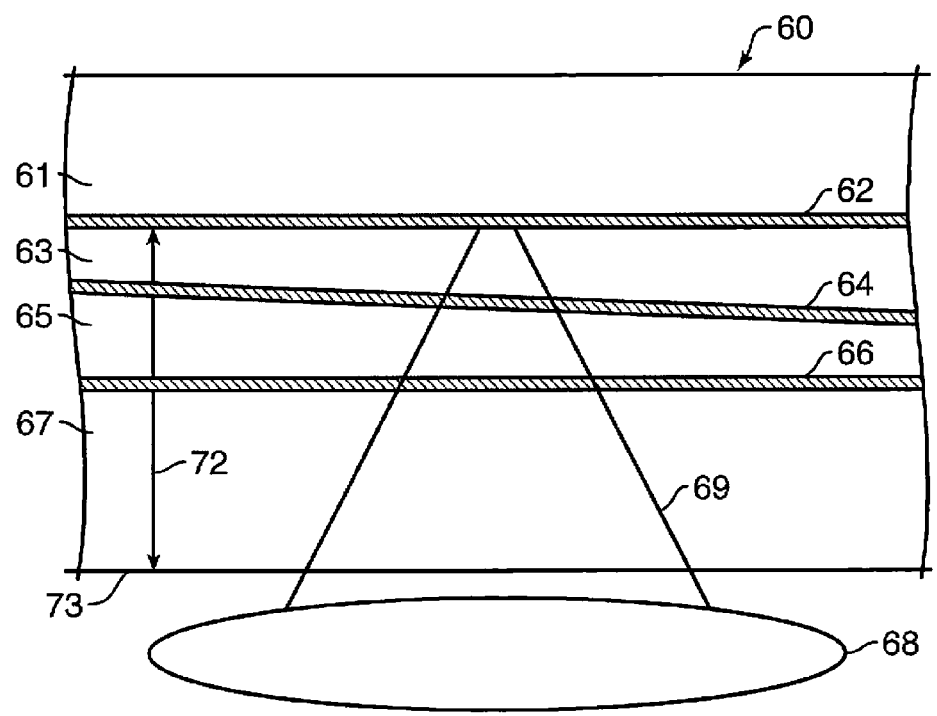
FIG. 7B is a diagram showing an arrangement of a multilayer information recording medium where thickness correction has been performed in a resin layer forming process.

Next, described is an influence on a reproduction signal characteristic referring to FIGS. 7A and 7B, in the case where each of the intermediate layers of the multilayer information recording medium has a thickness variation, and the intermediate layers having the thickness variations are laminated one over the other.

FIG. 7A is a diagram showing an arrangement of a multilayer information recording medium where thickness correction has not been performed in a resin layer forming process, and FIG. 7B is a diagram showing an arrangement of a multilayer information recording medium where thickness correction has been performed in a resin layer forming process. In this section, a multilayer information recording medium having three information recording layers is described referring to FIGS. 7A and 7B. However, the following phenomenon may occur, as far as a multilayer information recording medium has three or more information recording layers.

Referring to FIGS. 7A and 7B, a multilayer information recording medium 60 includes a signal substrate 61 having a concave-convex information surface with pits or guide grooves formed on one surface thereof, a first film layer 62 formed on the information surface of the signal substrate 61, a first intermediate layer 63 having a concave-convex information surface with pits or guide grooves formed on a surface thereof opposite to the signal substrate 61, a second film layer 64 formed on the information surface of the first intermediate layer 63, a second intermediate layer 65 having a concave-convex information surface with pits or guide grooves formed on a surface thereof opposite to the first intermediate layer 63, a third film layer 66 formed on the information surface of the second intermediate layer 65, and a transparent layer 67 formed on the third film layer 66. An objective lens 68 is disposed within the optical head 45 (see FIG. 6) to collect laser light 69 for recording or reproducing information onto each of the film layers. Further, optical path lengths 70, 71, and 72 each represents a distance from a light incident surface 73 of the transparent layer 67 to the first film layer 62.

In the following, an influence on thickness variation in reproducing information from the multilayer information recording medium is described. Substantially the same influence may occur in recording information into the multilayer information recording medium.

In reproducing information from the multilayer information recording medium, the laser light 69 is focused on an intended information recording layer (film layer). FIGS. 7A and 7B show a state that the laser light 69 is collected on the first film layer 62.

In this example, tracing a route of the laser light 69, firstly, the laser light 69 collected by the objective lens 68 is transmitted through the transparent layer 67 by the light amount obtained by multiplying an incident light amount with the transmittance of the transparent layer 67.

The wavelength of laser light to be used for a Blu-ray disc is near 405 nm, the refractive index of the laser light having the aforementioned wavelength in the air is 1.00, and the refractive index of the laser light having the aforementioned wavelength in the transparent layer 67 is generally not smaller than 1.45 but not larger than 1.70.

The laser light 69 transmitted through the transparent layer 67 is then transmitted through the third film layer 66 by the light amount obtained by multiplying an incident light amount with the transmittance of the third film layer 66, and the refraction angle of the laser light 69 is changed depending on a refractive index ratio between the transparent layer 67 and the third film layer 66.

Before the laser light 69 reaches the first film layer 62, the light amount of the laser light 69 is decreased depending on the transmittances of the second intermediate layer 65, the second film layer 64, and the first intermediate layer 63; and refraction depending on the refractive index ratio between the adjacent layers is repeated. Further, the laser light 69 collected on the first film layer 62 is reflected by the light amount obtained by multiplying an irradiated light amount with the reflectance of the first film layer 62, and is emitted in the direction opposite to the incident light direction, while repeating reduction of the light amount depending on the transmittances of the respective intermediate layers and the respective film layers. The laser light 69 emitted from the transparent layer 67 is entered into the detector (not shown) for converting light of a certain intensity into an electrical signal, and data is read out based on the converted electrical signal.

A lens is designed to reduce various aberrations so as to more accurately record and reproduce information in recording and reproducing information with respect to the multilayer information recording medium. Further, the focus control circuit 54 (see FIG. 6) is operable to reduce the beam spot diameter on the first film layer 62 so that size variation of even smaller recording marks is reduced in order to enhance the recording density.

Information is reproduced from an intended information recording layer by causing the laser light 69 to pass along the aforementioned optical path. However, as shown in FIG. 7A, in the case where thickness correction is not performed in a resin layer forming process, the optical path length may vary depending on which position within the multilayer information recording medium the laser light passes. For instance, in the case where the first intermediate layer 63 and the second intermediate layer 65 locally have a small thickness within a plane of the multilayer information recording medium, the optical path length 70 from the light incident surface 73 of the transparent layer 67 to the first film layer 62 is shortened (see FIG. 7A). Conversely, in the case where the first intermediate layer 63 and the second intermediate layer 65 locally have a large thickness within a plane of the multilayer information recording medium, the optical path length 71 from the light incident surface 73 of the transparent layer 67 to the first film layer 62 is extended (see FIG. 7A).

A change in the optical path length defuses the laser light 69, and deteriorates the signal quality. It is needles to say that defocus of the laser light 69 can be prevented by using a circuit for correcting an aberration depending on a change in the optical path length. However, it is extremely difficult to provide an aberration correcting circuit, in the case where a position where the optical path length is changed differs in each of the multilayer information recording media.

On the other hand, in the case of FIG. 7B, although the first intermediate layer 63 has a thickness variation and a thickness distribution substantially in the same manner as FIG. 7A, the second intermediate layer 65 is formed in such a manner as to correct the thickness distribution of the first intermediate layer 63. Accordingly, as is clear from FIG. 7B, the optical path length 72 from the light incident surface 73 of the transparent layer 67 to the first film layer 62 is constant at any position.

As described above, in the manufacturing process of the multilayer information recording medium, film layers and intermediate layers are laminated in a predetermined order on the signal substrate 61. In view of this, preferably, the multilayer information recording medium manufacturing apparatus is operable to grasp the thickness distribution of the first intermediate layer 63 before the second intermediate layer 65 is formed, and to form the second intermediate layer 65 in such a manner as to correct the thickness distribution of the first intermediate layer 63.

In the foregoing, an example of the multilayer information recording medium manufacturing method, and an example of the information recording/reproducing method for recording or reproducing information with respect to the multilayer information recording medium have been described. In the following, concrete examples of this embodiment are described in detail along with the advantages of the invention.

Example 1

In the following, a multilayer information recording medium manufacturing method as an example of the embodiment is described referring to FIG. 8, FIG. 9, FIG. 10, FIG. 11A, FIG. 11B, FIG. 12A and FIG. 12B.

Figure 8:
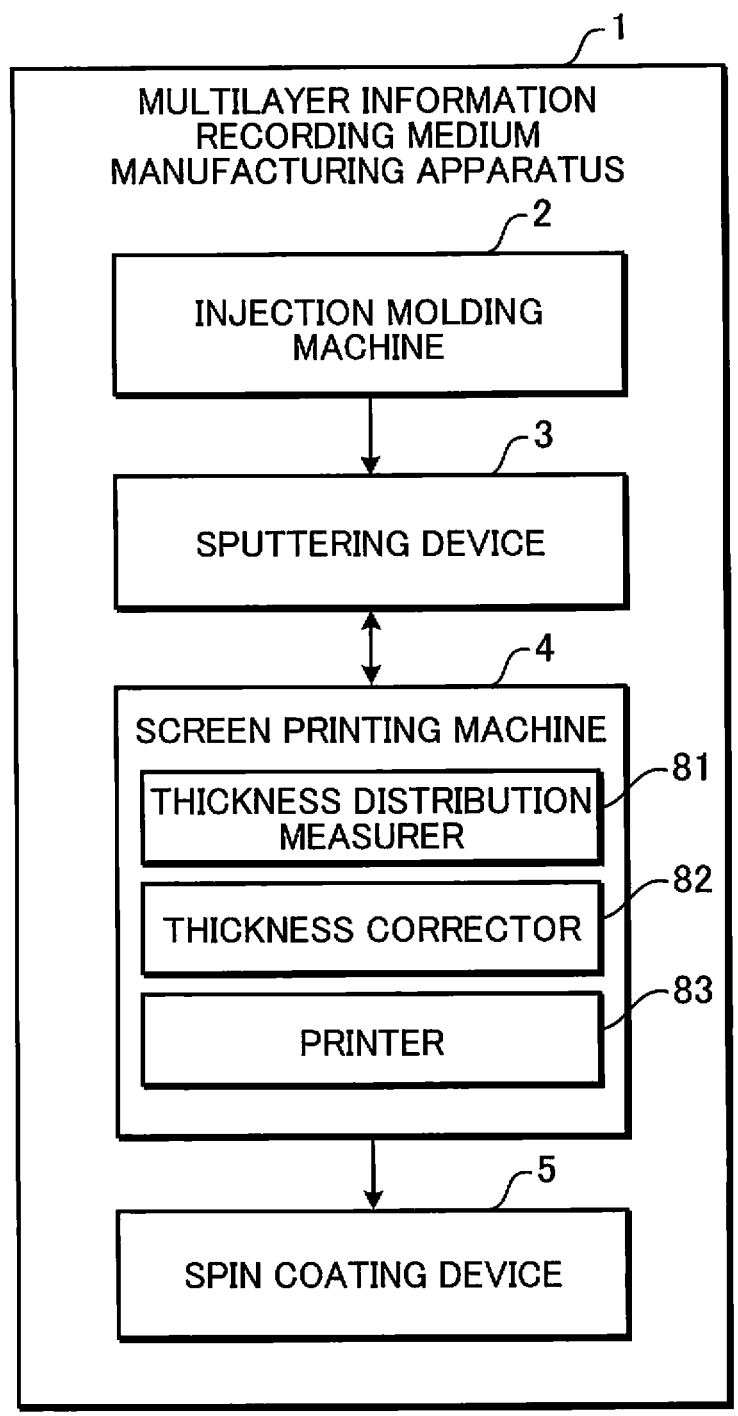
FIG. 8 is a block diagram showing an arrangement of a multilayer information recording medium manufacturing apparatus in Example 1.

FIG. 8 is a block diagram showing an arrangement of a multilayer information recording medium manufacturing apparatus in Example 1. A multilayer information recording medium manufacturing apparatus 1 shown in FIG. 8 is provided with an injection molding machine 2, a sputtering device 3, a screen printing machine 4, and a spin coating device 5.

The injection molding machine 2 manufactures a substrate (signal substrate 11) using e.g. polycarbonate as a resin material by injection molding. A concave-convex information surface having pits or guide grooves is formed on a surface of the signal substrate 11.

The sputtering device 3 forms information recording layers (first film layer 12, second film layer 14, third film layer 16, and fourth film layer 18) for recording information by e.g. a magnetron sputtering process. The sputtering device 3 forms the first film layer 12 on the information surface of the signal substrate 11, and forms the second film layer 14, the third film layer 16, and the fourth film layer 18 on the first intermediate layer 13, the second intermediate layer 15, and the third intermediate layer 17, respectively.

In this example, film layers are formed by a magnetron sputtering process. The invention is not specifically limited to the above, and film layers may be formed by other sputtering process.

The screen printing machine 4 forms resin layers (first intermediate layer 13, second intermediate layer 15, and third intermediate layer 17) on the film layers by a screen printing process. The screen printing machine 4 coats a UV curable resin on each of the film layers, forms pits or guide grooves on the layers of the UV curable resin, and irradiates UV light to thereby form the first intermediate layer 13, the second intermediate layer 15, and the third intermediate layer 17, respectively. The screen printing machine 4 forms the first intermediate layer 13, the second intermediate layer 15, and the third intermediate layer 17 on the first film layer 12, the second film layer 14, and the third film layer 16, respectively.

The screen printing machine 4 forms the first intermediate layer by screen printing, and forms the second intermediate layer by screen printing in such a manner that thickness variation of the multilayer information recording medium after the first intermediate layer has been formed is suppressed. In the present specification, the second intermediate layer is an intermediate layer to be formed following the first intermediate layer. Specifically, in the case where the second intermediate layer is the second intermediate layer 15, the first intermediate layer is the first film layer 12; and in the case where the second intermediate layer is the third intermediate layer 17, the first intermediate layer is the second intermediate layer 15.

The screen printing machine 4 is provided with a thickness distribution measurer 81, a thickness corrector 82, and a printer 83. The thickness distribution measurer 81 measures a thickness variation of the multilayer information recording medium before the second intermediate layer is formed and after the first intermediate layer has been formed. The thickness distribution measurer 81 is constituted of e.g. a laser interferometer, and measures a thickness distribution of the overall surface of the multilayer information recording medium by irradiating the surface of the multilayer information recording medium (signal substrate) with laser light.

The thickness corrector 82 sets a coating direction of coating a resin in forming the second intermediate layer by screen printing different from a coating direction in forming the first intermediate layer. Further, the thickness corrector 82 rotates a turntable for placing a substrate of the multilayer information recording medium thereon relative to the moving direction of a squeegee for coating a resin. Further, the thickness corrector 82 fixes the moving direction of the squeegee for coating a resin, and rotates the turntable for placing a substrate of the multilayer information recording medium thereon. Furthermore, the thickness corrector 82 rotates the turntable in such a manner that the position of the second intermediate layer having a largest thickness in forming the second intermediate layer is not overlapped with the position of the first intermediate layer having a largest thickness. In addition, the thickness corrector 82 rotates the turntable in such a manner that the position of the second intermediate layer having a largest thickness in forming the second intermediate layer is overlapped with the position of the first intermediate layer having a smallest thickness.

The printer 83 forms the second intermediate layer in such a manner that the thickness variation measured by the thickness distribution measurer 81 is suppressed.

The spin coating device 5 forms a cover layer (transparent layer 19) by a spin coating method. The spin coating device 5 forms the transparent layer 19 on the fourth film layer 18. The spin coating device 5 forms the cover layer by a spin coating method in such a manner that the inner peripheral thickness of the multilayer information recording medium becomes smaller than the outer peripheral thickness thereof after the second intermediate layer has been formed.

In Example 1, the sputtering device 3 corresponds to an example of an information recording layer forming section, the screen printing machine 4 corresponds to an example of an intermediate layer forming section, and the spin coating device 5 corresponds to an example of a cover layer forming section.

Figure 9:
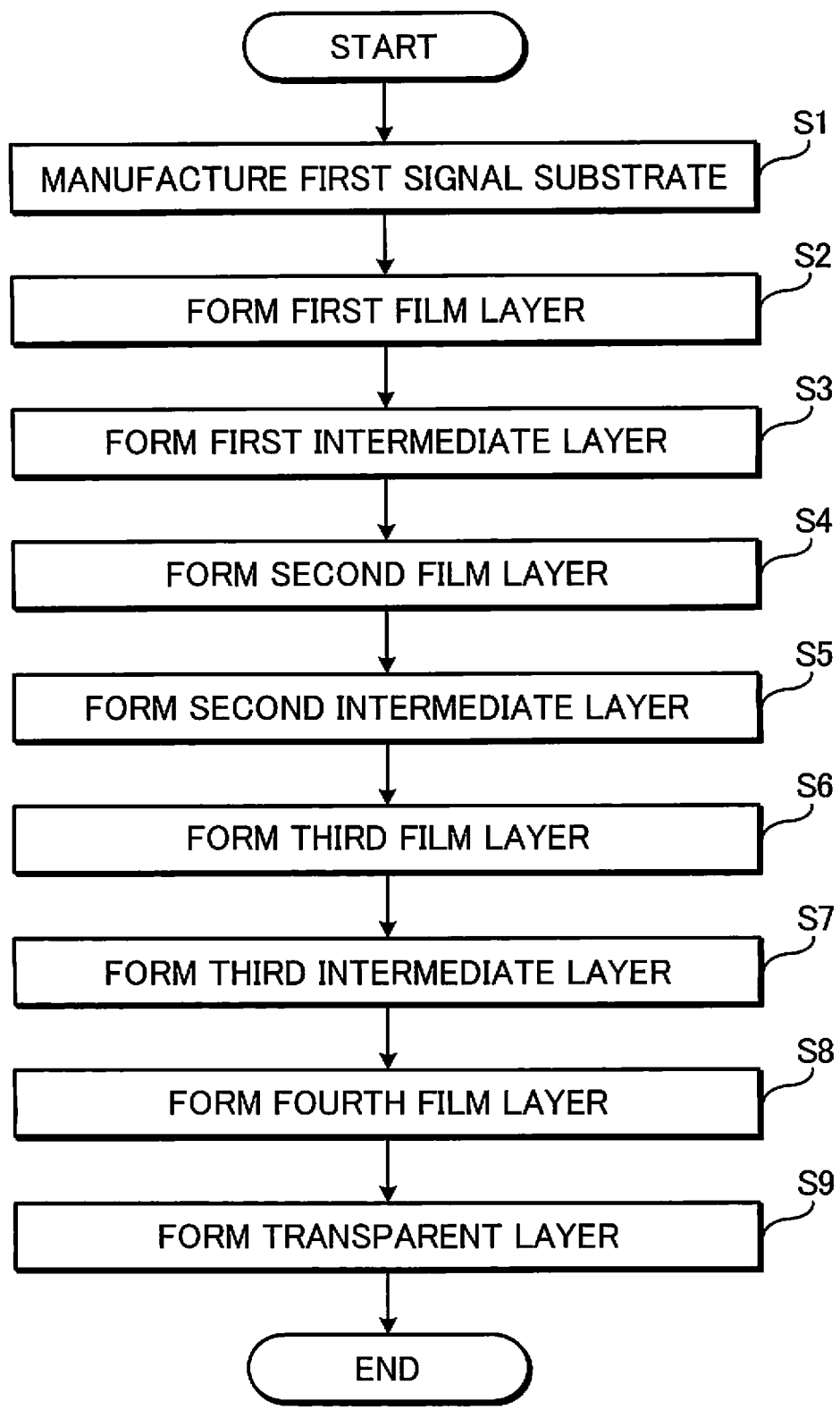
FIG. 9 is a diagram showing an example of an operation flow to be performed by a multilayer information recording medium manufacturing processing in Example 1.

Next, a process of manufacturing a multilayer information recording medium by the multilayer information recording medium manufacturing apparatus shown in FIG. 8 is described. FIG. 9 is a diagram showing an example of an operation flow to be performed by a multilayer information recording medium manufacturing processing in Example 1. The multilayer information recording medium manufacturing processing of manufacturing a multilayer information recording medium having four information recording layers is described referring to FIG. 9.

Firstly, in Step S1, the injection molding machine 2 manufactures the signal substrate 11 by injection molding. The signal substrate 11 manufactured by the injection molding machine 2 is carried to the sputtering device 3.

Then, in Step S2, the sputtering device 3 forms the first film layer 12 on the signal substrate 11 by a magnetron sputtering process. The signal substrate 11 having the first film layer 12 formed thereon by the sputtering device 3 is carried to the screen printing machine 4.

Then, in Step S3, the screen printing machine 4 forms the first intermediate layer 13 on the first film layer 12 by a screen printing process. The signal substrate 11 having the first intermediate layer 13 formed thereon by the screen printing machine 4 is carried to the sputtering device 3.

Then, in Step S4, the sputtering device 3 forms the second film layer 14 on the first intermediate layer 13 by a magnetron sputtering process. The signal substrate 11 having the second film layer 14 formed thereon by the sputtering device 3 is carried to the screen printing machine 4.

Then, in Step S5, the screen printing machine 4 forms the second intermediate layer 15 on the second film layer 14 by a screen printing process. The signal substrate 11 having the second intermediate layer 15 formed thereon by the screen printing machine 4 is carried to the sputtering device 3.

Then, in Step S6, the sputtering device 3 forms the third film layer 16 on the second intermediate layer 15 by a magnetron sputtering process. The signal substrate 11 having the third film layer 16 formed thereon by the sputtering device 3 is carried to the screen printing machine 4.

Then, in Step S7, the screen printing machine 4 forms the third intermediate layer 17 on the third film layer 16 by a screen printing process. The signal substrate 11 having the third intermediate layer 17 formed thereon by the screen printing machine 4 is carried to the sputtering device 3.

Then, in Step S8, the sputtering device 3 forms the fourth film layer 18 on the third intermediate layer 17 by a magnetron sputtering process. The signal substrate 11 having the fourth film layer 18 formed thereon by the sputtering device 3 is carried to the spin coating device 5.

Then, in Step S9, the spin coating device 5 forms the transparent layer 19 on the fourth film layer 18 by a spin coating method.

By performing the aforementioned Steps S1 through S9, a multilayer information recording medium having four information recording layers can be manufactured.

A multilayer information recording medium manufacturing processing of manufacturing a multilayer information recording medium having four information recording layers has been described referring to FIG. 9. It is possible to manufacture a multilayer information recording medium having information recording layers other than four information recording layers by repeating a film layer forming process and an intermediate layer forming process. Specifically, in the case where a multilayer information recording medium having N layers is manufactured, a process of forming a film layer (information recording layer) is performed N times, and a process of forming an intermediate layer (resin layer) is performed (N−1) times. For instance, in the case where a multilayer information recording medium having three information recording layers is manufactured, the operations in Steps S7 and S8 in FIG. 9 are omitted.

Figure 10:
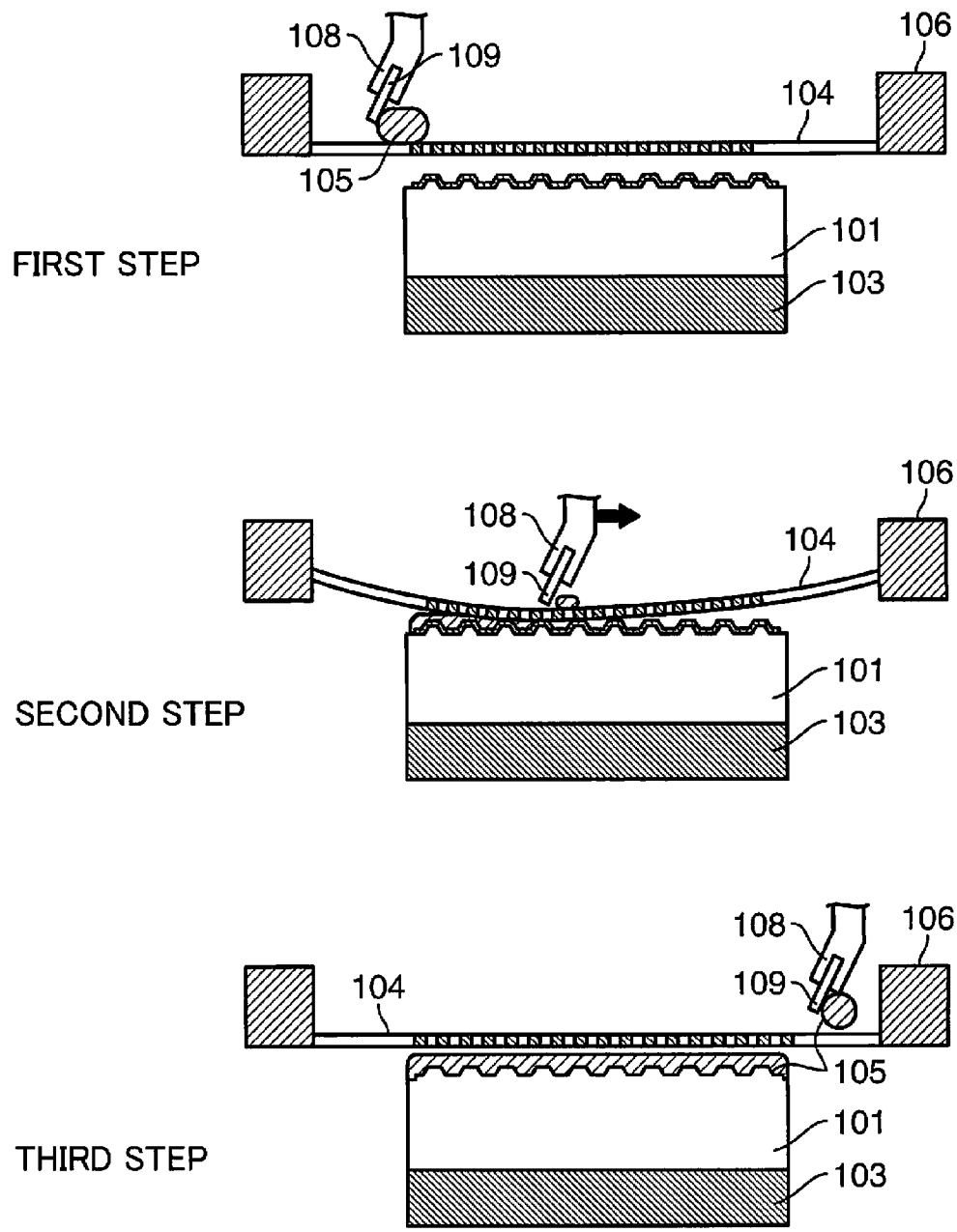
FIG. 10 is a diagram showing an example of a resin layer forming process in Example 1.
Figure 11A:
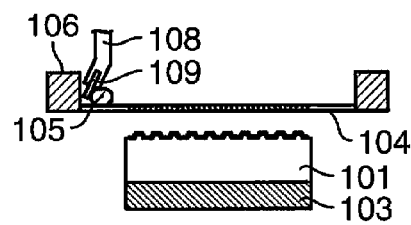
FIG. 11A is a cross-sectional view of a screen printing machine before a resin layer is formed.
Figure 11B:
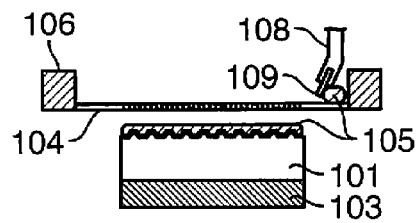
FIG. 11B is a cross-sectional view of the screen printing machine after a resin layer has been formed.

FIG. 10 is a diagram showing an example of the resin layer forming process in Example 1. FIG. 11A is a cross-sectional view of a screen printing machine before a resin layer is formed, FIG. 11B is a cross-sectional view of the screen printing machine after a resin layer has been formed, FIG. 12A is a top plan view of the screen printing machine before a resin layer is formed, and FIG. 12B is a top plan view of the screen printing machine after a resin layer has been formed.

FIG. 10 shows the screen printing machine before printing, during printing, and after printing. The screen printing machine shown in FIG. 10 is provided with a turntable 103 for fixedly supporting a signal substrate 101, a screen 104, a screen frame 106, a squeegee fixing jig 108, and a squeegee 109.

A method for manufacturing the screen 104 is described. Firstly, a gauze as a screen material is stretched over the screen frame 106, and a photosensitive emulsion is coated on the screen material. Then, an area other than a predetermined position (position where plural holes are to be formed) coated with the screen material is masked by a light shielding mask, and the screen material is irradiated with UV light by an exposure device for a predetermined time. The photosensitive emulsion exposed to the UV irradiation is washed by e.g. water jet for development. In this way, the screen 104 is manufactured.

Figure 12A:
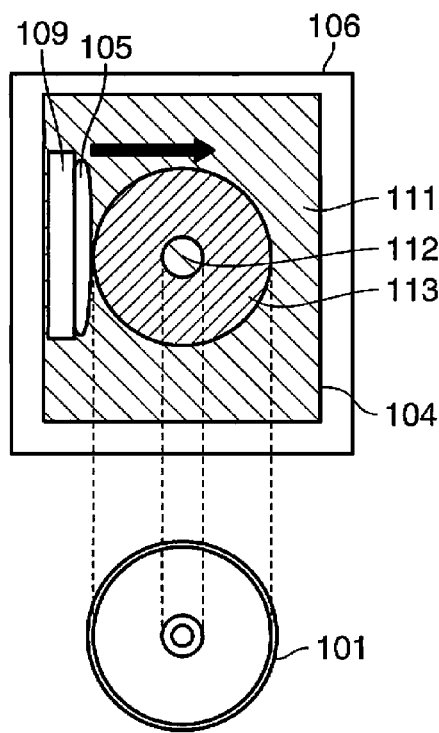
FIG. 12A is a top plan view of the screen printing machine before a resin layer is formed.
Figure 12B:
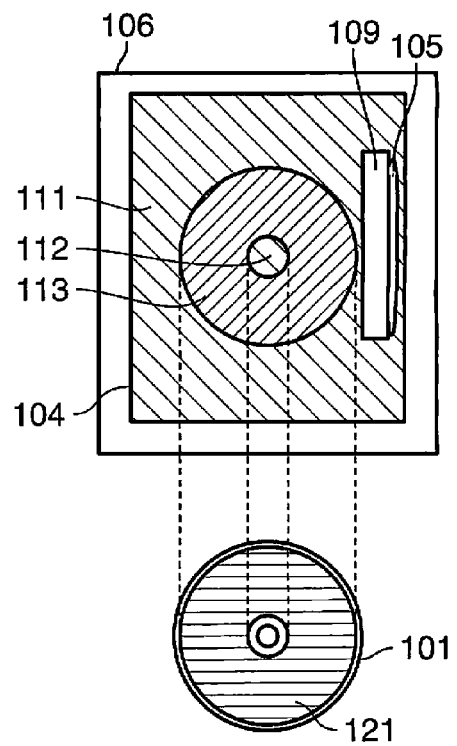
FIG. 12B is a top plan view of the screen printing machine after a resin layer has been formed.

In FIGS. 12A and 12B showing Example 1, areas 111 and 112 correspond to portions where the photosensitive emulsion remains on the gauze by the light shielding mask, and an area 113 corresponds to a portion where the gauze is exposed by light exposure.

Various materials such as wood, aluminium, stainless steel, or plastic may be used for the screen frame 106. Among these, it is preferable to use lightweight aluminium having a high rigidity. Various examples such as silk, nylon (registered trademark), tetron (registered trademark), a V-screen (registered trademark), or stainless steel may be used as the gauze serving as the screen material. Among these, it is preferable to use a V-screen in the aspect of restorability against an external pressure. An example of the photosensitive emulsion is an emulsion obtained by mixing and dissolving a diazonium salt or bichromate in PVA or a vinyl acetate emulsion. The number of meshes (number of wires per inch) at a certain position of the screen material is preferably from 100 to 600. As far as the number of meshes falls within a range of from 100 to 600, it is possible to apply a coat containing a resin without extrusion failure and thickness variation. The holes of the screen material are not limited to a mesh shape.

In Example 1, lightweight aluminium having a high rigidity is used as the screen frame 106, and a V-screen that enables to reduce a load to the signal substrate 101 is used as the screen 104. Alternatively, the example can be realized by using other material.

In the case where the viscosity of the UV curable resin 105 is low, the UV curable resin 105 after a coating step may flow out, with the result that the UV curable resin 105 may spread out of an end of the signal substrate 101 or may form a partly thickened layer. On the other hand, in the case where the viscosity of the UV curable resin 105 is high, the UV curable resin 105 is less likely to pass the screen 104, with the result that it is difficult to transfer the UV curable resin 105 onto the signal substrate 101. Considering a change in e.g. viscosity of the UV curable resin 105 resulting from a temperature change and a humidity change during a resin layer forming process, it is preferable to set the viscosity of the UV curable resin 105 in a range of from 30 cps to 10,000 cps.

It is possible to restrict a coating area of the UV curable resin 105 onto the signal substrate 101 by setting the area 113 where an opening is formed on the screen 104. In Example 1, it is thus possible to change an end position of a resin layer to be formed by changing the boundary position between the area 113 and the area 111.

The area 121 in FIG. 12B is an area where the UV curable resin 105 is coated on the signal substrate 101 by a screen printing process using the screen 104.

The thickness distribution of the UV curable resin 105 to be formed in the screen printing process is preferably uniform. Actually, however, the thickness may locally vary depending on mechanical precision of a jig to be used in the resin layer forming process.

Various factors are considered as factors of causing thickness variation. For instance, thickness variation occurs, in the case where the squeegee 109 is tilted with respect to the turntable 103, in the case where the squeegee 109 is partially damaged, or in the case where a pressure to be applied to the signal substrate 101 by the squeegee 109 is not constant.

Thickness variation may also occur, in the case where the thickness of gauze of the screen 104 differs depending on a position. Thickness variation may also occur, in the case where the thickness distribution of the signal substrate 101 is not uniform.

As described above, there are many factors of causing thickness variation, and the thickness variation depends on mechanical precision and dimensional precision of various parts and members. Further, considering deterioration of various members of the screen printing machine with time, it may be practically impossible to eliminate all the possible factors, and form a resin layer substantially free of thickness variation.

However, since these factors are unique to a device, unique to a substrate, or unique to a jig, reproducibility is very high, and it is possible to control the direction of thickness distribution by determining the printing direction or the setting direction of the signal substrate 101.

In the following, these is described an arrangement, wherein thickness variation occurs resulting from tilting of the turntable 103 with respect to the moving direction of the squeegee 109, referring to FIGS. 13A, 13B, 14A, 14B, and 14C.

Figure 13A:
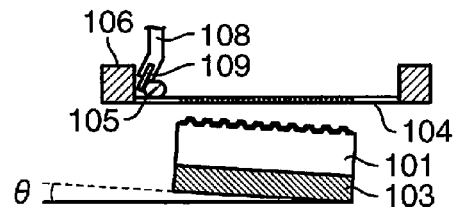
FIG. 13A is a cross-sectional view of the screen printing machine before a resin layer is formed.
Figure 13B:
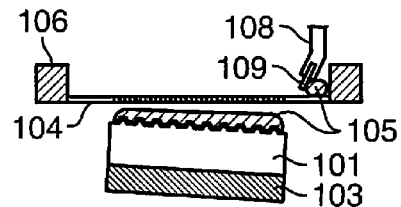
FIG. 13B is a cross-sectional view of the screen printing machine after a resin layer has been formed.
Figure 14A:
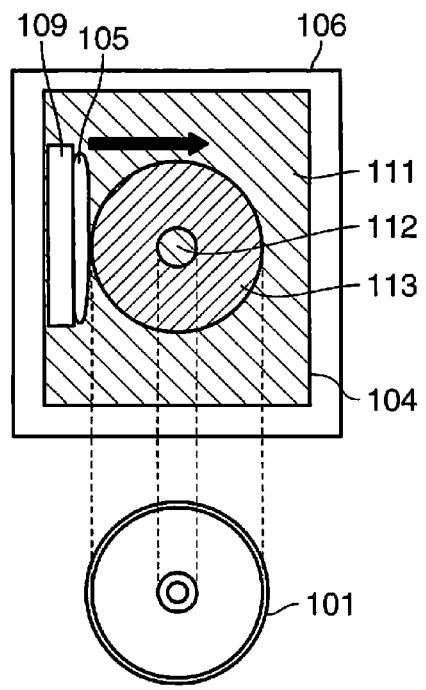
FIG. 14A is a top plan view of the screen printing machine before a resin layer is formed.
Figure 14B:
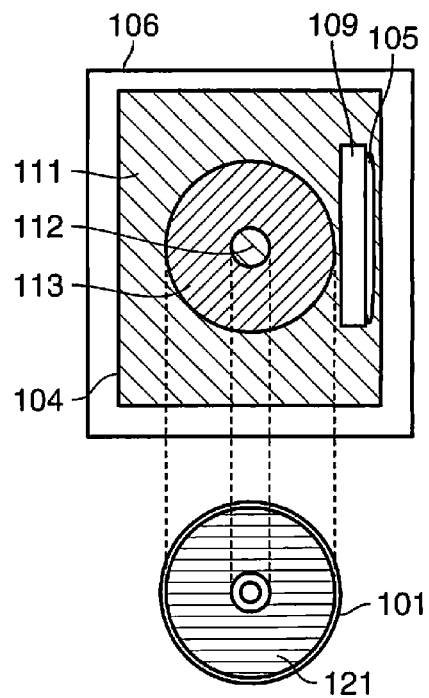
FIG. 14B is a top plan view of the screen printing machine having a resin layer formed thereon.
Figure 14C:
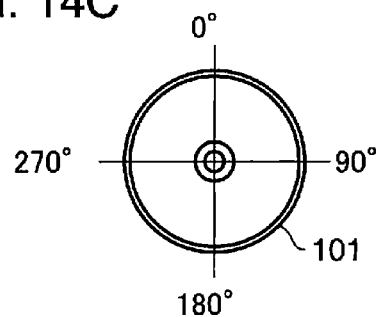
FIG. 14C is a diagram showing a signal substrate after a resin layer has been formed.

FIG. 13A is a cross-sectional view of a screen printing machine before a resin layer is formed, FIG. 13B is a cross-sectional view of the screen printing machine after a resin layer has been formed, FIG. 14A is a top plan view of the screen printing machine before a resin layer is formed, FIG. 14B is a top plan view of the screen printing machine after a resin layer has been formed, and FIG. 14C is a diagram showing a signal substrate having a resin layer formed thereon.

Referring to FIG. 13A, since the turntable 103 is tilted with respect to the moving direction of the squeegee 109 by the angle θ, the signal substrate 101 is fixedly supported with an inclination of the angle θ with respect to the moving direction of the squeegee 109. As is clear from FIG. 13A, although the distance between the squeegee 109 and the signal substrate 109 is short at the left-side coating start point on the screen 104, the distance between the squeegee 109 and the signal substrate 101 is increased at the right-side coating end point on the screen 104, as compared with the distance at the coating start point. As a result, the thickness of the layer of the UV curable resin 105 to be coated varies.

In the above case, as shown in FIG. 14C, the thickness of the UV curable resin 105 to be coated on an end of the signal substrate 101 in the direction of 90° is large, and the thickness of the UV curable resin 105 to be coated on an end of the signal substrate 101 in the direction of 270° is small. In this way, in the case where the thickness variation results only from linear inclination of the turntable 103 as shown in FIG. 13A, it is preferable to set the signal substrate 101 by turning the signal substrate 101 by 180°, so that the position of a succeeding resin layer having a largest thickness in forming the succeeding resin layer is aligned with the position of a preceding resin layer having a smallest thickness.

As described above, in the case where the thickness variation of the UV curable resin 105 results from a distance variation between the turntable 103 and the squeegee 109, the thickness variation distribution is not changed even if the moving direction of the squeegee 109 is reversed (changed from the rightward direction to the leftward direction in FIG. 13A).

Thus, the first intermediate layer is formed by screen printing, and the second intermediate layer is formed by screen printing in such a manner that thickness variation of the multilayer information recording medium after the first intermediate layer has been formed is suppressed. Then, after the second intermediate layer has been formed, the cover layer is formed by a spin coating method in such a manner that the inner peripheral thickness of the multilayer information recording medium becomes smaller than the outer peripheral thickness thereof.

The thickness distribution in radial direction of a multilayer information recording medium can be controlled by a spin coating method. Accordingly, it is possible to suppress thickness variation in radial direction of the multilayer information recording medium by the spin coating method. However, in the spin coating method, it is difficult to suppress thickness variation in circumferential direction of the multilayer information recording medium. Further, as described above, in screen printing, the inner peripheral thickness of the multilayer information recording medium tends to increase, as compared with the outer peripheral thickness, and laminating plural intermediate layers may increase the inner peripheral thickness of the multilayer information recording medium.

In view of the above, thickness variation in circumferential direction is reduced in forming the respective intermediate layers by screen printing, and thickness variation in radial direction is reduced in forming the cover layer by a spin coating method to thereby make the distance from a light incident surface of the multilayer information recording medium to a farthest information recording layer thereof uniform within a plane of the medium.

The thickness corrector 82 may rotate the turntable 103 in such a manner that the coating direction in forming the second intermediate layer perpendicularly intersects with the coating direction in forming the first intermediate layer.

In Example 1, the coating direction of coating a resin is changed by rotating the turntable 103 on which the multilayer information recording medium is placed. The invention is not limited to the above. It is possible to change the coating direction of coating a resin by placing the multilayer information recording medium on a fixed table, and rotating the moving direction of the squeegee 109.

Further alternatively, the coating direction of coating a resin may be changed by setting a table on which the multilayer information recording medium is placed in a fixed state, and placing and rotating the multilayer information recording medium on the table. In this case, although the turntable 103 may be provided with a rotation mechanism, preferably, the turntable 103 may be fixed, without providing a rotation mechanism.

Specifically, the direction of placing a substrate on a substrate holding table for placing a substrate of the multilayer information recording medium is made different between the process of forming the first intermediate layer, and the process of forming the second intermediate layer. Alternatively, the substrate may be held on the substrate holding table in such a manner that the position of the second intermediate layer having a largest thickness in forming the second intermediate layer, and the position of the first intermediate layer having a largest thickness are not overlapped. Further alternatively, the substrate may be held on the substrate holding table in such a manner that the position of the second intermediate layer having a largest thickness in forming the second intermediate layer, and the position of the first intermediate layer having a smallest thickness are overlapped. Further alternatively, the substrate may be held on the substrate holding table in such a manner that the coating direction in forming the second intermediate layer perpendicularly intersects with the coating direction in forming the first intermediate layer.

In performing the above operation, the thickness corrector 82 is preferably provided with a mechanism for placing a substrate on the substrate holding table. Further preferably, the thickness corrector 82 may have a mechanism for placing and rotating a substrate on the substrate holding table.

Screen printing is advantageous in forming a uniform resin layer by enhancing alignment precision between the moving direction of a squeegee and a table. Accordingly, in the case where the multilayer information recording medium is placed and rotated on a fixed table, it is possible to reduce a film thickness error of a resin layer, as compared with an arrangement of providing a rotation mechanism on a table.

Further, in the case where a multilayer information recording medium has N (N is an integer of 4 or larger) information recording layers and (N−1) intermediate layers, the thickness corrector 82 is operable to make the coating direction of coating a resin in forming the (N−1) intermediate layers, and the coating direction of coating a resin in forming the first intermediate layer to the (N−2) intermediate layers different from each other.

Example 2

In Example 1, there has been described an arrangement, wherein thickness variation results from inclination of the turntable 103. Since mesh hole variation of the screen 104, and thickness variation of the signal substrate 101 become thickness variation factors, in addition to the distance variation between the turntable 103 and the squeegee 109, actual thickness distribution of the UV curable resin 105 to be coated becomes very complicated.

Figure 15:
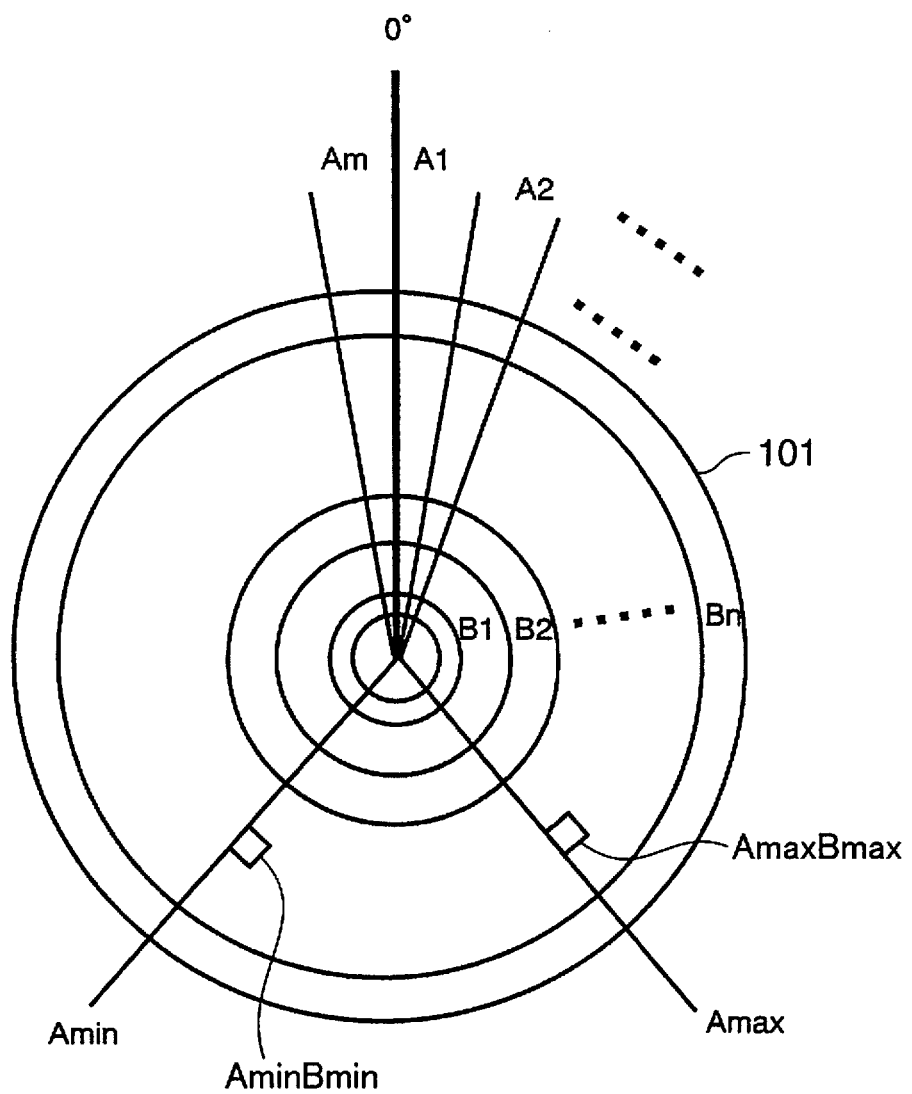
FIG. 15 is a diagram for describing a resin layer thickness variation measuring method and a thickness variation correcting method in Example 2.

A UV cured resin layer thickness measuring method, and a thickness correcting method are described referring to FIG. 15. FIG. 15 is a diagram for describing a resin layer thickness variation measuring method, and a thickness variation correcting method in Example 2. Since the arrangement of a multilayer information recording medium manufacturing apparatus shown in Example 2 is substantially the same as the arrangement of the multilayer information recording medium manufacturing apparatus 1 shown in Example 1, description thereof is omitted herein.

A predetermined radial direction of the signal substrate 101 is defined as the 0-degree direction, and a surface area of the signal substrate 101 is divided into m areas A1, A2, A3, ..., and Am circumferentially from the 0-degree direction to measure thickness variation of a resin layer formed on the signal substrate by a screen printing process. In this arrangement, it is preferable to correlate the 0-degree direction with a direction of installing a screen printing machine. Further, the surface area of the signal substrate 101 is divided into n areas B1, B2, B3, ..., and Bn concentrically and radially outwardly from the inner periphery thereof. With this arrangement, the surface area of the signal substrate 101 can be divided into (m×n) areas, and the respective areas obtained by circumferentially and radially dividing the surface area of the signal substrate 101 are called as areas AxBy (where x=1 through m, and y=1 through n). The thickness distribution measurer 81 measures the thicknesses of the UV cured resin layer (intermediate layer) of the divided areas AxBy. Further, an area of the UV cured resin layer having a largest thickness is defined as an area AmaxBmax, and an area of the UV cured resin layer having a smallest thickness is defined as an area AminBmin, based on a measurement result on the thicknesses of the intermediate layers.

The thickness of the area AxBy may be an average value of the thicknesses within the area AxBy, or a thickness at a central part of the area AxBy.

After an information recording layer (film layer) has been formed on the signal substrate 101 by the sputtering device 3, a succeeding intermediate layer is formed by the screen printing machine 4.

If the setting direction of the signal substrate 101 with respect to the screen printing machine in forming a succeeding resin layer is the same as the setting direction in forming the preceding resin layer, the thickness distribution becomes the same as in forming the preceding resin layer. As a result, the multilayer information recording medium has the thickness distribution shown in FIG. 7A, and a thickness difference between the position having a smallest thickness and the position having a largest thickness tends to increase from the light incident surface 73 to the first film layer 82.

In view of the above, it is desirable to rotate the angular position i.e. set the rotation angle of the signal substrate 101 with respect to the screen printing machine in such a manner that a circumferential position Amax where the area AmaxBmax resides is overlapped with a circumferential position Amin where the area AminBmin resides in order to realize the thickness distribution shown in FIG. 7B. Specifically, as shown in FIG. 15, it is preferable to rotate the signal substrate 101 in clockwise direction by the angle defined by the circumferential position Amin and the circumferential position Amax, and set the signal substrate 101 thereat on the turntable 103. The thickness corrector 82 rotates the turntable 103 by the angle defined by the circumferential position Amin and the circumferential position Amax.

In the above example, described is an arrangement, wherein the radial position (distance from the center of the signal substrate to the area AminBmin) of the area AminBmin, and the radial position (distance from the center of the signal substrate to the area AmaxBmax) of the area AmaxBmax are relatively close to each other. However, it is not always the case that the radial position of the area AminBmin and the radial position of the AmaxBmax are close to each other.

Figure 16:
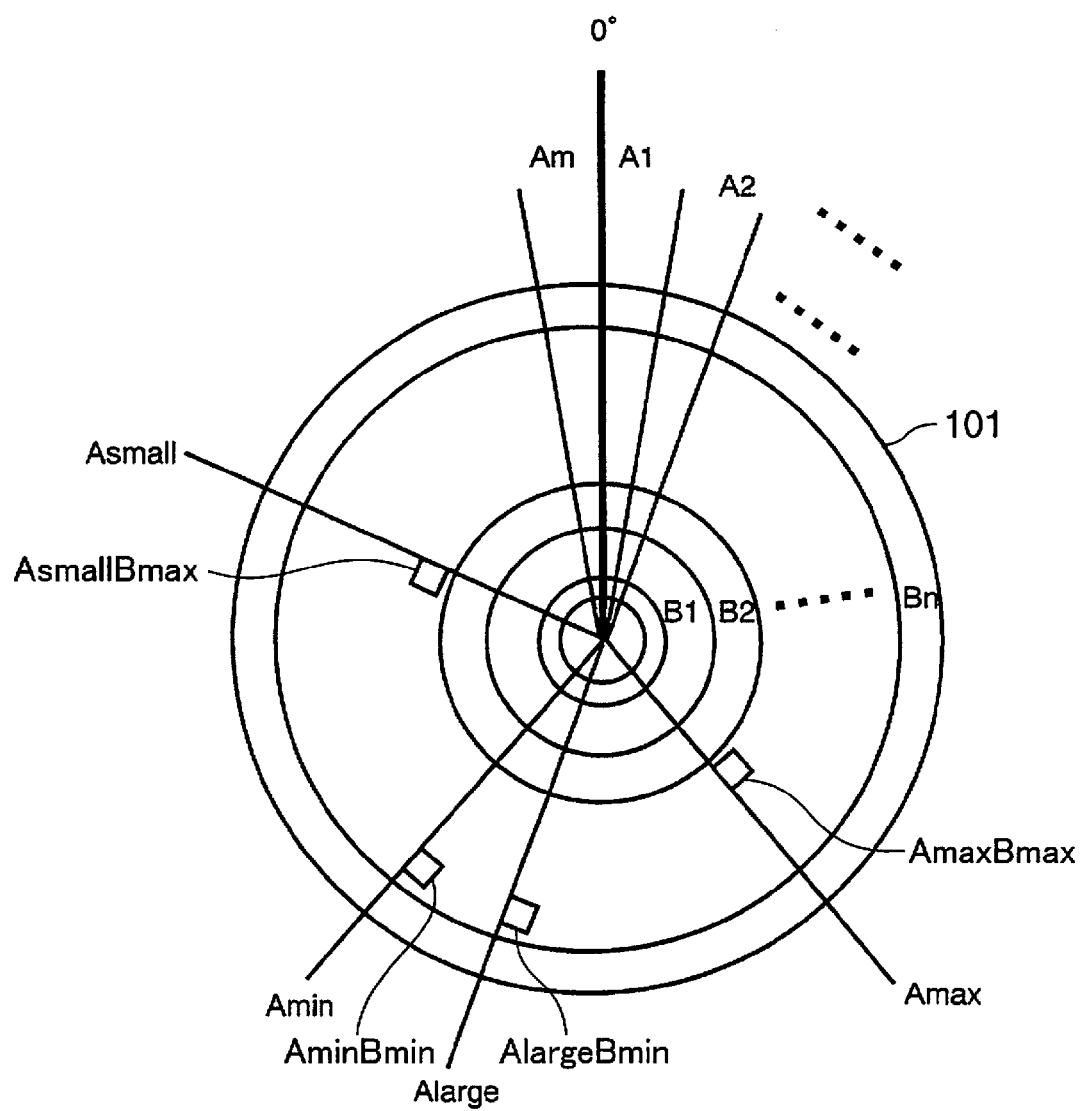
FIG. 16 is a diagram for describing a resin layer thickness variation measuring method and a thickness variation correcting method in a modification of Example 2.

In the following, described is an arrangement, wherein the radial position of the area AminBmin and the radial position of the AmaxBmax are away from each other, referring to FIG. 16. FIG. 16 is a diagram for describing a resin layer thickness variation measuring method and a thickness variation correcting method in a modification of Example 2.

Similarly to FIG. 15, a predetermined radial direction of the signal substrate 101 is defined as the 0-degree direction, and a surface area of the signal substrate 101 is divided into m areas A1, A2, A3, ..., and Am circumferentially from the 0-degree direction. Further, the surface area of the signal substrate 101 is divided into n areas B1, B2, B3, ..., and Bn concentrically and radially outwardly from the inner periphery thereof. The respective areas obtained by circumferentially and radially dividing the surface area of the signal substrate 101 are called as areas AxBy (where x=1 through m, and y=1 through n). Further, an area of the UV cured resin layer having a smallest thickness is defined as an AminBmin, and an area of the UV cured resin layer having a largest thickness is defined as an area AmaxBmax out of all the divided areas of the signal substrate 101.

As shown in FIG. 16, the radial position of the area AminBmin and the radial position of the area AmaxBmax are greatly away from each other. Accordingly, as described above, even if the signal substrate 101 is rotated by the angle defined by the circumferential position Amin and the circumferential position Amax, the effect of offsetting the mutual thickness distribution variations is weak.

In view of the above, the thickness corrector 82 searches an area having a largest thickness in radial position of the area AminBmin circumferentially, and defines an area having a largest thickness in radial position of the area AminBmin, as an area AlargeBmin. Further, the thickness corrector 82 searches an area having a smallest thickness in radial position of the area AmaxBmax circumferentially, and defines an area having a smallest thickness in radial position of the area AmaxBmax, as an area AsmallBmax.

Thus, it is preferable to rotate the angular position i.e. set the rotation angle of the signal substrate 101 in such a manner that the circumferential position Amax where the area AmaxBmax resides is overlapped with a circumferential position Asmall where the area AsmallBmax resides to offset the thickness variations of the area AmaxBmax. Specifically, the thickness corrector 82 rotates the turntable 103 by the angle defined by the circumferential position Asmall and the circumferential position Amax, and the printer 83 forms a succeeding resin layer.

Further, it is preferable to rotate the angular position of the signal substrate 101 i.e. set the rotation angle of the signal substrate 101 in such a manner that the circumferential position Amin where the area AminBmin resides is overlapped with a circumferential position Alarge where the area AlargeBmin resides to offset the thickness variations of the area AminBmin. Specifically, the thickness corrector 82 rotates the turntable 103 by the angle defined by the circumferential position Amin and the circumferential position Alarge, and the printer 83 forms a succeeding resin layer.

However, it is not always the case that the angle defined by the circumferential position Asmall and the circumferential position Amax is equal to the angle defined by the circumferential position Amin and the circumferential position Alarge. In view of the above, it is preferable to estimate the effects obtained by the respective rotations, select one of the angles which provides a greater effect, and determine the rotation angle of the signal substrate 101 (turntable 103).

For instance, the thickness corrector 82 calculates thicknesses of the respective areas AxBy obtained by laminating resin layers, while rotating the signal substrate by the angle defined by the circumferential position Asmall and the circumferential position Amax, and thicknesses of the respective areas AxBy obtained by laminating resin layers, while rotating the signal substrate by the angle defined by the circumferential position Amin and the circumferential position Alarge, based on the measured thicknesses of the respective areas AxBy. Then, the thickness corrector 82 calculates average values of thicknesses of the respective areas AxBy after the lamination in both of the cases, and compares the respective calculated average values with a predetermined value. Then, the thickness corrector 82 rotates the turntable 103 by the angle corresponding to a smaller difference between the respective calculated average values and the predetermined value. The predetermined value is a predefined optimum thickness value.

Thus, in the case where plural resin layers are formed by a screen printing method, it is desirable to grasp in advance the direction of thickness variation or the position of thickness variation of a resin layer that has already been formed, and to form a succeeding resin layer in such a manner that a thickness distribution is generated in a direction of offsetting the thickness variations. Specifically, in forming a succeeding resin layer, preferably, the screen printing machine is operable to grasp the thickness distribution of a resin layer that has already been formed, and to set the signal substrate 101 in a proper direction.

The thickness corrector 82 may be operable to correct a thickness distribution resulting from the moving direction of the squeegee by changing the moving direction of the squeegee depending on the direction of the signal substrate 101.

Further alternatively, in the case where a multilayer information recording medium has N (where N is an integer of 4 or larger) information recording layers, and (N−1) intermediate layers, the thickness distribution measurer 81 may measure the thickness of an intermediate layer that has been formed immediately before the measurement, and the thickness corrector 82 may correct the thickness of a succeeding intermediate layer to be formed, based on the measured thickness. Further alternatively, the thickness distribution measurer 81 may measure the sum of thicknesses of all the intermediate layers that have already been formed, and the thickness corrector 82 may correct the thickness of a succeeding intermediate layer to be formed, based on the measured thickness sum.

Further alternatively, in the case where the radial position (distance from the center of the signal substrate) of the area AminBmin having a smallest thickness of the UV cured resin layer, and the radial position of the area AmaxBmax having a largest thickness of the UV cured resin layer are different from each other, the thickness corrector 82 may determine the angle by which the turntable 103 is rotated, based on one of the areas AminBmin and the area AmaxBmax which is located closer to the outer peripheral side.

Similarly to Example 1, in Example 2, the table on which the multilayer information recording medium is placed may be fixed, and the coating direction of coating a resin may be changed by placing and rotating the multilayer information recording medium on the table.

Example 3

In Example 3, there is described a thickness correcting method capable of suppressing thickness variation of a resin layer with a less number of processes. As described above, the thickness of a resin layer is likely to depend on the moving direction of the squeegee, in other words, the setting direction of the signal substrate with respect to the screen printing machine. Accordingly, if the information representing the setting direction of the signal substrate with respect to the screen printing machine in performing screen printing, and thickness variation inherent to the screen printing machine can be grasped in advance, the thickness variation of a resin layer that has already been formed can be predicted. However, in this case, after a first intermediate layer (resin layer) has been formed, the routine proceeds to a process of forming an information recording layer (film layer). In a film forming process of forming an information recording layer, a metal and dielectric film is formed by e.g. sputtering or vapor deposition. In this case, generally, the signal substrate is rotated to make the thickness distribution of a reflection film constant in circumferential direction.

As described above, the film forming process intervenes between the resin layer forming processes. Accordingly, in the case where plural resin layers are formed, the signal substrate may be rotated during the film forming process, which may make it difficult or impossible to determine the printing direction of a resin layer that has already been formed.

In view of the above, in Example 3, a reference area is formed in an inner periphery of the signal substrate to identify the printing direction in forming a resin layer. The reference area can be formed by screen printing.

Figure 17:
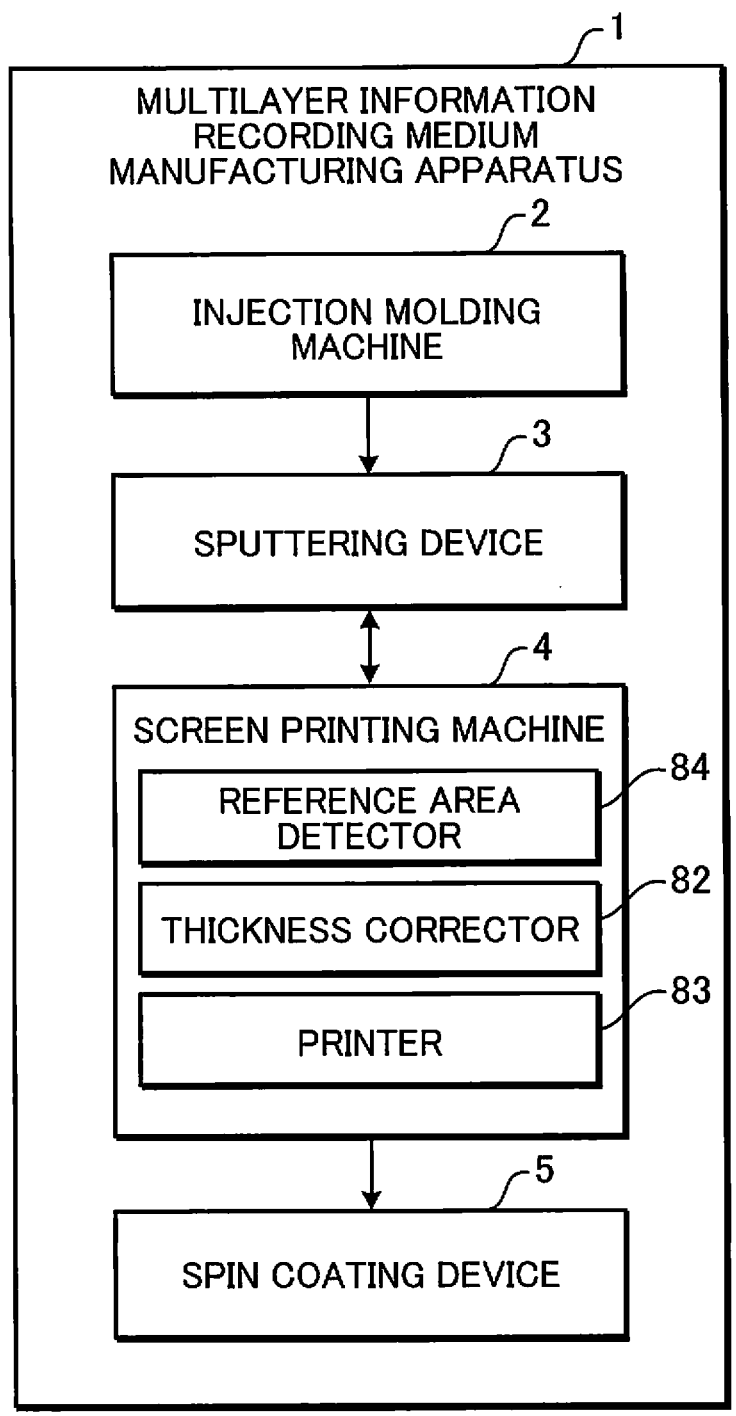
FIG. 17 is a block diagram showing an arrangement of a multilayer information recording medium manufacturing apparatus in Example 3.

FIG. 17 is a block diagram showing an arrangement of a multilayer information recording medium manufacturing apparatus in Example 3. A multilayer information recording medium manufacturing apparatus 1 shown in FIG. 17 is provided with an injection molding machine 2, a sputtering device 3, a screen printing machine 4, and a spin coating device 5. The elements of the multilayer information recording medium manufacturing apparatus 1 shown in FIG. 17, which are substantially equivalent or identical to those of the multilayer information recording medium manufacturing apparatus shown in FIG. 8, are indicated with the same reference numerals, and description thereof is omitted herein.

The screen printing machine 4 in Example 3 is provided with a reference area detector 84, a thickness corrector 82, and a printer 83. The printer 83 forms a reference area for use in recognizing a disposition position of the multilayer information recording medium with respect to the coating direction of coating a resin in forming the first intermediate layer. The printer 83 forms a reference area on the inner peripheral side than the area where the first intermediate layer is formed.

The reference area detector 84 recognizes a current disposition position of the multilayer information recording medium, based on the reference area. The thickness corrector 82 rotates the multilayer information recording medium to such a position that the current disposition position of the multilayer information recording medium that has been recognized by the reference area detector 84 coincides with the disposition position of the multilayer information recording medium in forming the first intermediate layer. The printer 83 forms the second intermediate layer in such a manner that the thickness variation of the multilayer information recording medium that has been rotated by the thickness corrector 82 is suppressed.

Figure 18:
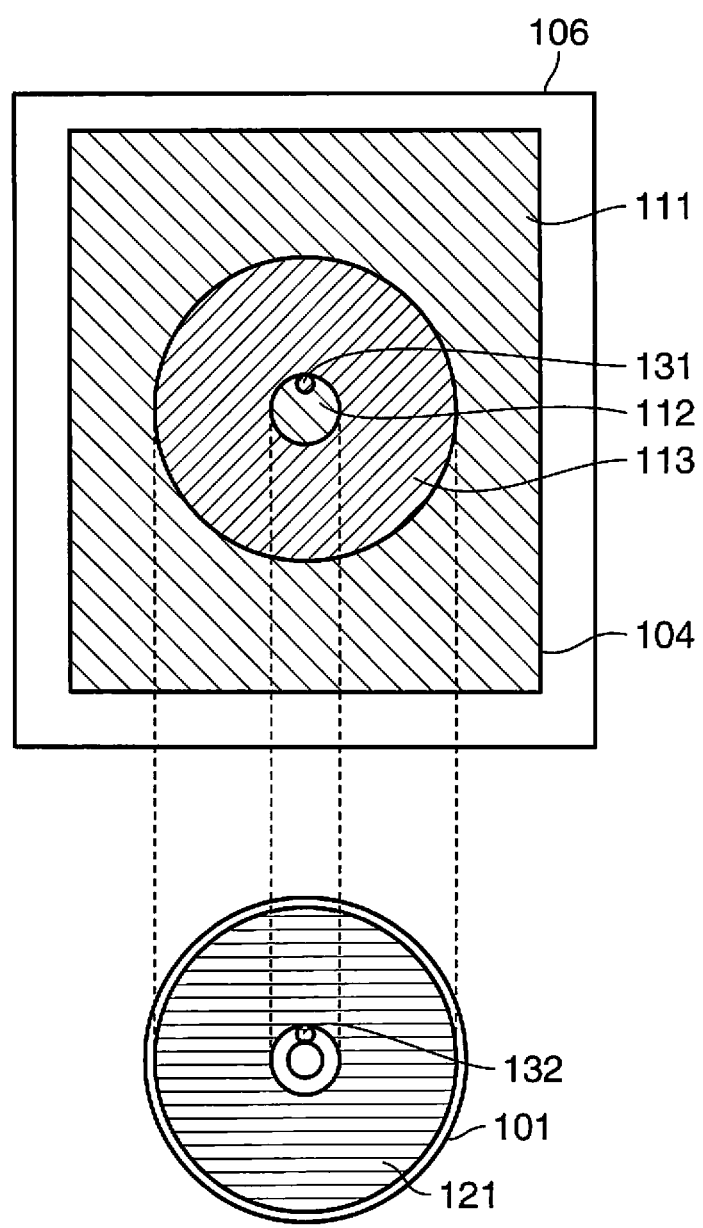
FIG. 18 is a diagram showing a pattern of a screen, and a signal substrate having a resin layer formed thereon by using the screen.
Figure 19:
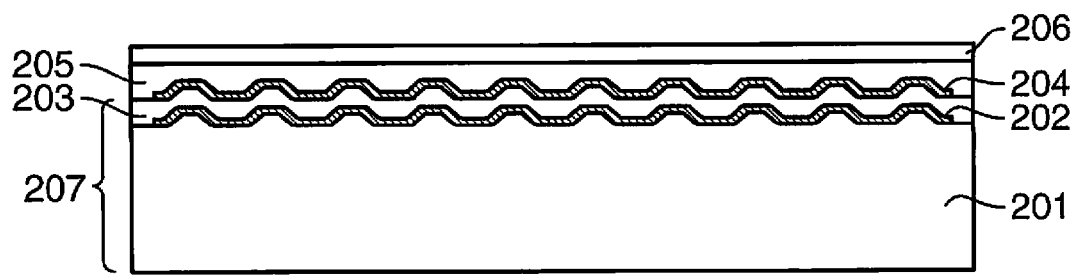
FIG. 19 is a cross-sectional view of a conventional multilayer information recording medium.

FIG. 18 is a diagram showing a pattern of a screen, and a signal substrate having a resin layer formed thereon, using the screen. As shown in FIG. 18, in a normal state, an area 112 at the inner periphery of the signal substrate is coated with a photosensitive emulsion, and is not coated with a resin. However, in Example 3, a screen 104 is manufactured by removing a photosensitive emulsion from an area 131, which is a part of the inner periphery of the area 112. Screen printing is performed by using the screen 104. Since the area 131 is not coated with a photosensitive emulsion, a resin passes the area 131. Thus, a resin is coated at a position, corresponding to the area 131, of the inner periphery of the signal substrate 101, thereby forming a reference area 132.

As described above, the reference area 132 is formed at the inner periphery of the signal substrate 101, and the position of the reference area 132 is detected, which makes it possible to grasp in which direction the signal substrate 101 is set with respect to the screen 104, and in which direction the signal substrate 101 is set with respect to the screen printing machine.

Accordingly, the reference area detector 84 detects the reference area 132 formed on the signal substrate 101, and the thickness corrector 82 rotates the turntable 103 to such a position that the detected reference area 132 coincides with a predetermined reference position, whereby the signal substrate 101 is disposed at a predetermined position. Thereafter, the thickness corrector 82 rotates the turntable 103 by a rotation angle stored in advance in an internal memory, and the printer 83 forms a resin layer.

For instance, thickness variation inherent to the screen printing machine 4 is measured in advance, the rotation angle of the turntable 103 that enables to correct the measured thickness variation is calculated, and the calculated rotation angle is stored in the internal memory. The rotation angle is determined substantially in the same manner as Example 1 and Example 2. Then, the position of the reference area 132 is detected in forming a first resin layer, and the signal substrate 101 is disposed at the reference position, based on the detected position of the reference area 132. Then, in forming a succeeding resin layer, the position of the reference area 132 is detected, and the signal substrate 101 is disposed at the reference position, based on the detected position of the reference area 132. Then, the signal substrate 101 is rotated in accordance with the rotation angle stored in the memory in advance, and a UV curable resin is coated.

Thus, thickness variation inherent to the screen printing machine can be detected, without measuring a thickness distribution of a resin layer.

Further, grasping the above directions of the signal substrate enables to optimize the setting position of the signal substrate 101 in forming a succeeding resin layer.

In Example 3, the reference area 132 is formed in such a manner as to increase the coating amount of a resin onto the inner periphery of the signal substrate 101. The invention is not specifically limited to the above. As far as the reference area 132 has the dimensions capable of detecting the position of the signal substrate 101 by a sensor, the shape and the forming position of the reference area 132 are not limited. Further, in Example 3, the reference area 132 is formed by additionally coating a resin on an inner periphery where the resin is not supposed to be coated. Conversely, a resin may be coated on the entirety of an inner periphery, and a reference area may be formed by removing the resin from a part of the inner periphery. This enables to use the reference area as a mark indicating the disposing direction of the signal substrate.

Further, the multilayer information recording medium manufacturing apparatus 1 in Example 3 may be provided with the thickness distribution measurer 81 in Example 1 and Example 2.

The screen is sandwiched between the squeegee and the signal substrate, when the squeegee passes over the signal substrate. If the distance between the squeegee and the signal substrate is small, the amount of resin which may flow over the screen is increased, and the amount of resin to be coated on the signal substrate is reduced. In view of this, it is preferable to set the distance between the signal substrate and the squeegee constant. Specifically, in the case where the thickness of the signal substrate is small, or in the case where the turntable itself is lowered, the distance between the squeegee and the signal substrate is increased, with the result that the thickness of a resin layer may be increased. In other words, the thickness of a resin layer is increased, in the case where the thickness of the signal substrate is small; and the thickness of a resin layer is increased, in the case where the distance between the squeegee and the signal substrate is large.

Further, the thickness corrector 82 may be operable to change the moving speed of the squeegee for coating a resin in performing screen printing, depending on a position on the signal substrate where a resin is coated. In the case where the moving speed of the squeegee which moves over the screen is fast, a resin is less likely to follow the moving squeegee. As a result, the resin is less likely to stay over the screen, and fall off through the meshes of the screen, which may increase the amount of resin to be coated on the signal substrate. In other words, as the moving speed of the squeegee is increased, the thickness of an intermediate layer to be formed is increased. In view of this, for instance, the thickness corrector 82 is operable to change the moving speed of the squeegee between a case of forming an intermediate layer on an inner periphery of the multilayer information recording medium, and a case of forming an intermediate layer on an outer periphery of the multilayer information recording medium. In particular, the thickness corrector 82 is operable to set the moving speed of the squeegee in forming an intermediate layer on the inner periphery of the multilayer information recording medium faster than the moving speed of the squeegee in forming an intermediate layer on the outer periphery of the multilayer information recording medium. This enables to suppress thickness variation of the multilayer information recording medium in circumferential direction resulting from screen printing.

Further, the thickness corrector 82 may change the inclination of the squeegee for coating a resin in performing screen printing, depending on a position where the resin is coated. As the inclination of the squeegee with respect to the screen is increased, the thickness of an intermediate layer to be formed is reduced. In view of this, for instance, the thickness corrector 82 is operable to change the inclination of the squeegee between a case of forming an intermediate layer on an inner periphery of the multilayer information recording medium, and a case of forming an intermediate layer on an outer periphery of the multilayer information recording medium. In particular, the thickness corrector 82 is operable to set the inclination of the squeegee in forming an intermediate layer on the inner periphery of the multilayer information recording medium smaller than the inclination of the squeegee in forming an intermediate layer on the outer periphery of the multilayer information recording medium.

This enables to suppress thickness variation of the multilayer information recording medium in circumferential direction resulting from screen printing.

As described above, it is possible to form a multilayer information recording medium having a more desirable signal characteristic by changing the moving speed of the squeegee and/or the inclination of the squeegee depending on a position where a resin is coated.

Similarly to Example 1, in Example 3, the table on which the multilayer information recording medium is placed may be fixed, and the coating direction of coating a resin may be changed by placing and rotating the multilayer information recording medium on the table.

Although Examples 1 through 3 may be individually carried out, it is possible to form a multilayer information recording medium having a more desirable signal characteristic by carrying out the invention by combining Examples 1 through 3.

The aforementioned embodiment and examples mainly include the features having the following arrangements.

A multilayer information recording medium manufacturing method according to an aspect of the invention is a multilayer information recording medium manufacturing method for manufacturing a multilayer information recording medium having at least three information recording layers. The method includes a first information recording layer forming step of forming a first information recording layer on a substrate; a first intermediate layer forming step of forming a first intermediate layer on the first information recording layer by screen printing; a second information recording layer forming step of forming a second information recording layer on the first intermediate layer; a second intermediate layer forming step of forming a second intermediate layer on the second information recording layer by screen printing in such a manner that thickness variation of the multilayer information recording medium after the first intermediate layer has been formed is suppressed; a third information recording layer forming step of forming a third information recording layer on the second intermediate layer; and a cover layer forming step of forming a cover layer by a spin coating method in such a manner that a thickness of an inner periphery of the multilayer information recording medium after the third information recording layer has been formed becomes smaller than a thickness of an outer periphery of the multilayer information recording medium.

With the arrangement described above, the first information recording layer is formed on the substrate, and the first intermediate layer is formed on the first information recording layer by screen printing. Then, the second information recording layer is formed on the first intermediate layer, and the second intermediate layer is formed on the second information recording layer by screen printing in such a manner that thickness variation of the multilayer information recording medium after the first intermediate layer has been formed is suppressed. Then, after the third information recording layer has been formed on the second intermediate layer, the cover layer is formed by a spin coating method in such a manner that the thickness of the inner periphery of the multilayer information recording medium becomes smaller than the thickness of the outer periphery of the multilayer information recording medium.

The thickness distribution in radial direction of a multilayer information recording medium can be controlled by a spin coating method. Accordingly, it is possible to suppress thickness variation in radial direction of the multilayer information recording medium by the spin coating method. However, in the spin coating method, it is difficult to suppress thickness variation in circumferential direction of the multilayer information recording medium. Further, as described above, in screen printing, the inner peripheral thickness of the multilayer information recording medium tends to increase, as compared with the outer peripheral thickness, and laminating plural intermediate layers may increase the inner peripheral thickness of the multilayer information recording medium.

In view of the above, thickness variation in circumferential direction is reduced in forming the respective intermediate layers by screen printing, and thickness variation in radial direction is reduced in forming the cover layer by a spin coating method to thereby make the distance from a light incident surface of the multilayer information recording medium to a farthest information recording layer thereof uniform within a plane of the medium.

In the multilayer information recording medium manufacturing method, preferably, the second intermediate layer forming step may include a measuring step of measuring thickness variation of the multilayer information recording medium before the second intermediate layer is formed and after the first intermediate layer has been formed; and a forming step of forming the second intermediate layer in such a manner that the thickness variation measured in the measuring step is suppressed.

With the arrangement described above, since the thickness variation of the multilayer information recording medium before the second intermediate layer is formed and after the first intermediate layer has been formed is measured, and the second intermediate layer is formed in such a manner that the measured thickness variation is suppressed, it is possible to form the second intermediate layer after the thickness variation of the first intermediate layer has been grasped.

In the multilayer information recording medium manufacturing method, preferably, in the second intermediate layer forming step, a coating direction of coating a resin in performing the screen printing may be made different from a coating direction in forming the first intermediate layer.

With the arrangement as described above, since the second intermediate layer is formed in such a manner that the coating direction of coating the resin in performing the screen printing is made different from the coating direction in forming the first intermediate layer, it is possible to suppress thickness variation in circumferential direction resulting from screen printing.

In the multilayer information recording medium manufacturing method, preferably, in the second intermediate layer forming step, a substrate holding table that places a substrate of the multilayer information recording medium thereon may be rotated relative to a moving direction of a squeegee that coats the resin.

With the arrangement described above, the coating direction of the resin in forming the second intermediate layer is changed by rotating the substrate holding table that places a substrate of the multilayer information recording medium thereon relative to the moving direction of the squeegee that coats a resin. This enables to easily change the coating direction of the resin in forming the second intermediate layer, as compared with an arrangement of changing the moving direction of the squeegee.

In the multilayer information recording medium manufacturing method, preferably, in the second intermediate layer forming step, the substrate holding table may be rotated in such a manner that a position of the second intermediate layer having a largest thickness in forming the second intermediate layer is not overlapped with a position of the first intermediate layer having a largest thickness.

With the arrangement described above, since the substrate holding table is rotated in such a manner that the position of the second intermediate layer having the largest thickness in forming the second intermediate layer is not overlapped with the position of the first intermediate layer having the largest thickness, it is possible to suppress thickness variation in circumferential direction resulting from screen printing.

In the multilayer information recording medium manufacturing method, preferably, in the second intermediate layer forming step, the substrate holding table may be rotated in such a manner that a position of the second intermediate layer having a largest thickness in forming the second intermediate layer is overlapped with a position of the first intermediate layer having a smallest thickness.

With the arrangement described above, since the substrate holding table is rotated in such a manner that the position of the second intermediate layer having the largest thickness in forming the second intermediate layer is overlapped with the position of the first intermediate layer having the smallest thickness, it is possible to suppress thickness variation in circumferential direction resulting from screen printing.

In the multilayer information recording medium manufacturing method, preferably, in the second intermediate layer forming step, the substrate holding table may be rotated in such a manner that a coating direction in forming the second intermediate layer perpendicularly intersects with a coating direction in forming the first intermediate layer.

With the arrangement described above, since the substrate holding table is rotated in such a manner that the coating direction in forming the second intermediate layer perpendicularly intersects with the coating direction in forming the first intermediate layer, it is possible to suppress thickness variation resulting from the moving direction of the squeegee.

In the multilayer information recording medium manufacturing method, preferably, a direction of placing the substrate on a substrate holding table that places a substrate of the multilayer information recording medium thereon may be made different between the first intermediate layer forming step and the second intermediate layer forming step.

With the arrangement described above, since the direction of placing the substrate on the substrate holding table that places a substrate of the multilayer information recording medium thereon is made different between the first intermediate layer forming step and the second intermediate layer forming step, it is possible to suppress thickness variation in circumferential direction resulting from screen printing.

In the multilayer information recording medium manufacturing method, preferably, in the second intermediate layer forming step, the substrate may be placed on the substrate holding table in such a manner that a position of the second intermediate layer having a largest thickness in forming the second intermediate layer is not overlapped with a position of the first intermediate layer having a largest thickness.

With the arrangement described above, since the substrate is placed on the substrate holding table in such a manner that the position of the second intermediate layer having the largest thickness in forming the second intermediate layer is not overlapped with the position of the first intermediate layer having the largest thickness, it is possible to suppress thickness variation in circumferential direction resulting from screen printing.

In the multilayer information recording medium manufacturing method, preferably, in the second intermediate layer forming step, the substrate may be placed on the substrate holding table in such a manner that a position of the second intermediate layer having a largest thickness in forming the second intermediate layer is overlapped with a position of the first intermediate layer having a smallest thickness.

With the arrangement described above, since the substrate is placed on the substrate holding table in such a manner that the position of the second intermediate layer having the largest thickness in forming the second intermediate layer is overlapped with the position of the first intermediate layer having the smallest thickness, it is possible to suppress thickness variation in circumferential direction resulting from screen printing.

In the multilayer information recording medium manufacturing method, preferably, in the second intermediate layer forming step, the substrate may be placed on the substrate holding table in such a manner that a coating direction in forming the second intermediate layer perpendicularly intersects with a coating direction in forming the first intermediate layer.

With the arrangement described above, since the substrate is placed on the substrate holding table in such a manner that the coating direction in forming the second intermediate layer perpendicularly intersects with the coating direction in forming the first intermediate layer, it is possible to suppress thickness variation resulting from the moving direction of the squeegee.

In the multilayer information recording medium manufacturing method, preferably, in the second intermediate layer forming step, an inclination of a squeegee that coats a resin in performing the screen printing may be changed depending on a position where the resin is coated.

With the arrangement described above, the inclination of the squeegee that coats a resin in performing the screen printing is changed depending on the position where the resin is coated. As the inclination of the squeegee with respect to the screen is increased, the thickness of an intermediate layer to be formed is decreased. Accordingly, for instance, it is possible to suppress thickness variation in circumferential direction resulting from screen printing by changing the inclination of the squeegee between the case of forming an intermediate layer on the inner periphery of the multilayer information recording medium, and the case of forming an intermediate layer on the outer periphery of the multilayer information recording medium.

In the multilayer information recording medium manufacturing method, preferably, in the second intermediate layer forming step, a moving speed of a squeegee that coats a resin in performing the screen printing may be changed depending on a position where the resin is coated.

With the arrangement described above, the moving speed of the squeegee that coats a resin in performing the screen printing is changed depending on the position where the resin is coated. As the moving speed of the squeegee is increased, the thickness of an intermediate layer to be formed is increased. Accordingly, for instance, it is possible to suppress thickness variation in circumferential direction resulting from screen printing by changing the moving speed of the squeegee between the case of forming an intermediate layer on the inner periphery of the multilayer information recording medium, and the case of forming an intermediate layer on the outer periphery of the multilayer information recording medium.

In the multilayer information recording medium manufacturing method, preferably, in the first intermediate layer forming step, a reference area for use in recognizing a disposition position of the multilayer information recording medium with respect to a coating direction of coating a resin in forming the first intermediate layer may be formed, and the second intermediate layer forming step may include a recognizing step of recognizing a current disposition position of the multilayer information recording medium, based on the reference area, a disposition position changing step of rotating the multilayer information recording medium in such a manner that the current disposition position of the multilayer information recording medium recognized in the recognizing step coincides with a disposition position of the multilayer information recording medium in forming the first intermediate layer, and a forming step of forming the second intermediate layer in such a manner that thickness variation of the multilayer information recording medium rotated in the disposition position changing step is suppressed.

With the arrangement described above, the reference area for use in recognizing the disposition position of the multilayer information recording medium with respect to the coating direction of coating a resin in forming the first intermediate layer is formed. Then, the current disposition position of the multilayer information recording medium is recognized, based on the reference area, and the multilayer information recording medium is rotated in such a manner that the recognized current disposition position of the multilayer information recording medium coincides with the disposition position of the multilayer information recording medium in forming the first intermediate layer. Thereafter, the second intermediate layer is formed in such a manner that thickness variation of the rotated multilayer information recording medium is suppressed.

Generally, a process of forming an information recording layer, and a process of forming an intermediate layer are performed by different devices. Accordingly, there is a likelihood that the disposition position of the multilayer information recording medium after the first intermediate layer has been formed, and the disposition of the multilayer information recording medium in forming the second intermediate layer may differ from each other. In view of this, the reference area for use in recognizing the disposition position of the multilayer information recording medium after the first intermediate layer has been formed is formed; and the multilayer information recording medium is rotated in such a manner that the current disposition position of the multilayer information recording medium that has been recognized based on the reference area coincides with the disposition position of the multilayer information recording medium after the first intermediate layer has been formed.

Thus, since the disposition position of the multilayer information recording medium after the first intermediate layer has been formed, and the disposition position of the multilayer information recording medium in forming the second intermediate layer coincide with each other, it is possible to suppress thickness variation inherent to a screen printing machine can be suppressed without the need of measuring thickness variation of the multilayer information recording medium after the first intermediate layer has been formed.

In the multilayer information recording medium manufacturing method, preferably, in the first intermediate layer forming step, the reference area may be formed at an inner peripheral side than an area where the first intermediate layer is formed.

With the arrangement described above, since the reference area is formed at the inner peripheral side than the area where the first intermediate layer is formed, it is possible to form the reference area simultaneously in forming the first intermediate layer, thereby easily forming the reference area.

A multilayer information recording medium manufacturing apparatus according to another aspect of the invention is a multilayer information recording medium manufacturing apparatus for manufacturing a multilayer information recording medium having at least three information recording layers. The apparatus includes an information recording layer forming section that forms at least three information recording layers; an intermediate layer forming section that forms a first intermediate layer by screen printing, and forms a second intermediate layer by screen printing in such a manner that thickness variation of the multilayer information recording medium having the first intermediate layer is suppressed; and a cover layer forming section that forms a cover layer by a spin coating method in such a manner that a thickness of an inner periphery of the multilayer information recording medium having the second intermediate layer becomes smaller than a thickness of an outer periphery of the multilayer information recording medium.

With the arrangement described above, at least the three information recording layers are formed, the first information recording layer is formed by screen printing, and the second information recording layer is formed by screen printing in such a manner that thickness variation of the multilayer information recording medium after the first intermediate layer has been formed is suppressed. Then, after the second information recording layer has been formed, the cover layer is formed by a spin coating method in such a manner that the thickness of the inner periphery of the multilayer information recording medium becomes smaller than the thickness of the outer periphery of the multilayer information recording medium.

The thickness distribution in radial direction of a multilayer information recording medium can be controlled by a spin coating method. Accordingly, it is possible to suppress thickness variation in radial direction of the multilayer information recording medium by the spin coating method. However, in the spin coating method, it is difficult to suppress thickness variation in circumferential direction of the multilayer information recording medium. Further, as described above, in screen printing, the inner peripheral thickness of the multilayer information recording medium tends to increase, as compared with the outer peripheral thickness, and laminating plural intermediate layers may increase the inner peripheral thickness of the multilayer information recording medium.

In view of the above, thickness variation in circumferential direction is reduced in forming the respective intermediate layers by screen printing, and thickness variation in radial direction is reduced in forming the cover layer by a spin coating method to thereby make the distance from a light incident surface of the multilayer information recording medium to a farthest information recording layer thereof uniform within a plane of the medium.

A multilayer information recording medium according to yet another aspect of the invention includes at least three information recording layers; a plurality of intermediate layers to be formed between the information recording layers; and a cover layer including a light incident surface, wherein the plurality of the intermediate layers include a first intermediate layer formed by screen printing, and a second intermediate layer formed by screen printing in such a manner that thickness variation of the multilayer information recording medium having the first intermediate layer is suppressed, and the cover layer is formed by a spin coating method in such a manner that a thickness of an inner periphery of the multilayer information recording medium having the second intermediate layer becomes smaller than a thickness of an outer periphery of the multilayer information recording medium.

With the arrangement described above, at least the three information recording layers are formed, the first information recording layer is formed by screen printing, and the second information recording layer is formed by screen printing in such a manner that thickness variation of the multilayer information recording medium after the first intermediate layer has been formed is suppressed. Then, after the second information recording layer has been formed, the cover layer is formed by a spin coating method in such a manner that the thickness of the inner periphery of the multilayer information recording medium becomes smaller than the thickness of the outer periphery of the multilayer information recording medium.

The thickness distribution in radial direction of a multilayer information recording medium can be controlled by a spin coating method. Accordingly, it is possible to suppress thickness variation in radial direction of the multilayer information recording medium by the spin coating method. However, in the spin coating method, it is difficult to suppress thickness variation in circumferential direction of the multilayer information recording medium. Further, as described above, in screen printing, the inner peripheral thickness of the multilayer information recording medium tends to increase, as compared with the outer peripheral thickness, and laminating plural intermediate layers may increase the inner peripheral thickness of the multilayer information recording medium.

In view of the above, thickness variation in circumferential direction is reduced in forming the respective intermediate layers by screen printing, and thickness variation in radial direction is reduced in forming the cover layer by a spin coating method to thereby make the distance from a light incident surface of the multilayer information recording medium to a farthest information recording layer thereof uniform within a plane of the medium.

The embodiments or the examples described in the detailed description of the invention are provided to clarify the technical contents of the invention. The invention should not be construed to be limited to the embodiments or the examples. The invention may be modified in various ways as far as such modifications do not depart from the spirit and the scope of the invention hereinafter defined.

INDUSTRIAL APPLICABILITY

The inventive multilayer recording medium manufacturing method, the inventive multilayer information recording medium manufacturing apparatus, and the inventive multilayer information recording medium enable to make a distance from a light incident surface of the multilayer information recording medium to a farthest information recording layer thereof uniform within a plane of the medium; and accordingly are useful as a multilayer information recording medium including at least three information recording layers, plural intermediate layers formed between the information recording layers, and a cover layer having a light incident surface, a multilayer information recording method for manufacturing the multilayer information recording medium, and a multilayer information recording medium manufacturing apparatus for manufacturing the multilayer information recording medium. Further, the invention is applicable to e.g. manufacturing a large-capacity memory.

What is claimed is:
1. A multilayer information recording medium manufacturing method for manufacturing a multilayer information recording medium having at least three information recording layers, the method comprising:

a first information recording layer forming step of forming a first information recording layer on a substrate;

a first intermediate layer forming step of forming a first intermediate layer on the first information recording layer by screen printing;

a second information recording layer forming step of forming a second information recording layer on the first intermediate layer;

a second intermediate layer forming step of forming a second intermediate layer on the second information recording layer by screen printing in such a manner that thickness variation of the multilayer information recording medium after the first intermediate layer has been formed is suppressed;

a third information recording layer forming step of forming a third information recording layer on the second intermediate layer; and a cover layer forming step of forming a cover layer by a spin coating method in such a manner that a thickness of an inner periphery of the multilayer information recording medium after the third information recording layer has been formed becomes smaller than a thickness of an outer periphery of the multilayer information recording medium.

2. The multilayer information recording medium manufacturing method according to claim 1, wherein
the second intermediate layer forming step includes
a measuring step of measuring thickness variation of the multilayer information recording medium before the second intermediate layer is formed and after the first intermediate layer has been formed; and
a forming step of forming the second intermediate layer in such a manner that the thickness variation measured in the measuring step is suppressed.

3. The multilayer information recording medium manufacturing method according to claim 1, wherein
in the second intermediate layer forming step, a coating direction of coating a resin in performing the screen printing is made different from a coating direction in forming the first intermediate layer.

4. The multilayer information recording medium manufacturing method according to claim 3, wherein
in the second intermediate layer forming step, a substrate holding table that places a substrate of the multilayer information recording medium thereon is rotated relative to a moving direction of a squeegee that coats the resin.

5. The multilayer information recording medium manufacturing method according to claim 4, wherein
in the second intermediate layer forming step, the substrate holding table is rotated in such a manner that a position of the second intermediate layer having a largest thickness in forming the second intermediate layer is not overlapped with a position of the first intermediate layer having a largest thickness.

6. The multilayer information recording medium manufacturing method according to claim 5, wherein
in the second intermediate layer forming step, the substrate holding table is rotated in such a manner that a position of the second intermediate layer having a largest thickness in forming the second intermediate layer is overlapped with a position of the first intermediate layer having a smallest thickness.

7. The multilayer information recording medium manufacturing method according to claim 5, wherein
in the second intermediate layer forming step, the substrate holding table is rotated in such a manner that a coating direction in forming the second intermediate layer perpendicularly intersects with a coating direction in forming the first intermediate layer.

8. The multilayer information recording medium manufacturing method according to claim 3, wherein
a direction of placing the substrate on a substrate holding table that places a substrate of the multilayer information recording medium thereon is made different between the first intermediate layer forming step and the second intermediate layer forming step.

9. The multilayer information recording medium manufacturing method according to claim 8, wherein
in the second intermediate layer forming step, the substrate is placed on the substrate holding table in such a manner that a position of the second intermediate layer having a largest thickness in forming the second intermediate layer is not overlapped with a position of the first intermediate layer having a largest thickness.

10. The multilayer information recording medium manufacturing method according to claim 8, wherein
in the second intermediate layer forming step, the substrate is placed on the substrate holding table in such a manner that a position of the second intermediate layer having a largest thickness in forming the second intermediate layer is overlapped with a position of the first intermediate layer having a smallest thickness.

11. The multilayer information recording medium manufacturing method according to claim 5, wherein
in the second intermediate layer forming step, the substrate is placed on the substrate holding table in such a manner that a coating direction in forming the second intermediate layer perpendicularly intersects with a coating direction in forming the first intermediate layer.

12. The multilayer information recording medium manufacturing method according to claim 1, wherein
in the second intermediate layer forming step, an inclination of a squeegee that coats a resin in performing the screen printing is changed depending on a position where the resin is coated.

13. The multilayer information recording medium manufacturing method according to claim 1, wherein
in the second intermediate layer forming step, a moving speed of a squeegee that coats a resin in performing the screen printing is changed depending on a position where the resin is coated.

14. The multilayer information recording medium manufacturing method according to claim 1, wherein
in the first intermediate layer forming step, a reference area for use in recognizing a disposition position of the multilayer information recording medium with respect to a coating direction of coating a resin in forming the first intermediate layer is formed, and
the second intermediate layer forming step includes
a recognizing step of recognizing a current disposition position of the multilayer information recording medium, based on the reference area,
a disposition position changing step of rotating the multilayer information recording medium in such a manner that the current disposition position of the multilayer information recording medium recognized in the recognizing step coincides with a disposition position of the multilayer information recording medium in forming the first intermediate layer, and
a forming step of forming the second intermediate layer in such a manner that thickness variation of the multilayer information recording medium rotated in the disposition position changing step is suppressed.

15. The multilayer information recording medium manufacturing method according to claim 14, wherein
in the first intermediate layer forming step, the reference area is formed at an inner peripheral side than an area where the first intermediate layer is formed.

16. A multilayer information recording medium manufacturing apparatus for manufacturing a multilayer information recording medium having at least three information recording layers, the apparatus comprising:
an information recording layer forming section that forms at least three information recording layers;
an intermediate layer forming section that forms a first intermediate layer by screen printing, and forms a second intermediate layer by screen printing in such a manner that thickness variation of the multilayer information recording medium having the first intermediate layer is suppressed; and
a cover layer forming section that forms a cover layer by a spin coating method in such a manner that a thickness of an inner periphery of the multilayer information recording medium having the second intermediate layer becomes smaller than a thickness of an outer periphery of the multilayer information recording medium.

17. A multilayer information recording medium comprising:
at least three information recording layers;
a plurality of intermediate layers to be formed between the information recording layers; and
a cover layer including a light incident surface, wherein
the plurality of the intermediate layers include a first intermediate layer formed by screen printing, and a second intermediate layer formed by screen printing in such a manner that thickness variation of the multilayer information recording medium having the first intermediate layer is suppressed, and
the cover layer is formed by a spin coating method in such a manner that a thickness of an inner periphery of the multilayer information recording medium having the second intermediate layer becomes smaller than a thickness of an outer periphery of the multilayer information recording medium.

* * * * *